United States Patent [19]
Hess

[11] Patent Number: 4,764,867
[45] Date of Patent: Aug. 16, 1988

[54] DISPLAY SYSTEM AND METHOD FOR CONSTRUCTING AND EDITING A HIERARCHICAL ARRANGEMENT OF INFORMATION

[75] Inventor: Kenneth L. Hess, Fremont, Calif.

[73] Assignee: Banner Blue Software Incorporated, Newark, Calif.

[21] Appl. No.: 870,179

[22] Filed: Jun. 3, 1986

[51] Int. Cl.[4] .............................................. G06F 3/14
[52] U.S. Cl. ..................................... 364/200; 364/521
[58] Field of Search ............... 364/200, 300, 518, 521, 364/900

[56] References Cited

U.S. PATENT DOCUMENTS

| | | | |
|---|---|---|---|
| 4,477,880 | 10/1984 | Advani et al. | 364/900 |
| 4,556,954 | 12/1985 | Advani | 364/900 |
| 4,613,946 | 9/1986 | Forman | 364/521 |

OTHER PUBLICATIONS

Beta Test Site Agreement; signed 4/9/85, pp. 1-2.
Software Proprietary and Confidentiality Agreement; signed 3/29/85, p. 1.
Software Submission Agreement; signed 3/29/85, pp. 1-2.
Software Distribution Agreement; signed 6/4/85, pp. 1-5.

Primary Examiner—Raulfe B. Zache
Attorney, Agent, or Firm—A. C. Smith

[57] ABSTRACT

A user-controlled interactive computer display system and method is disclosed for manipulating a hierarchy of information (a topmost node and a number of subordinate nodes, each with only one superior node). This display system and method allows a hierarchical arrangement of information to be constructed and changed with a minimum of steps and errors because positional information about each node is handled implicitly by the system.

21 Claims, 7 Drawing Sheets

```
NAME     Jane Doe_____     ABBREV  _____
TITLE    Vice President_____ ABBREV  _____
COMMENT  Radar Components_____ ABBREV  _____
CHART LEVEL   2  ·   ·   ·   ·  LINE TYPE  S
```

```
NAME   1 John Doe_____    CHART LEVEL  3   LINE TYPE  S
       2 George Baker_____                3              S
       3 Sam Smith_____                3              S
       4 ====================                 3              S
```

```
NAME   George Simko_____    ABBREV_____
TITLE  Executive Vice President__ ABBREV_____
```

```
NAME  1 Lind
      2 Dani
      3 Curt
      4 Edwa
      5____
```

Select the individual
to display and press
the enter key

A. Bigelow
A. Johnson
A. McMinn
Ames
Anne Cherniss-Cook
B. Hughes
C. Brewer
C. Irish
C. Thomas
Charles Carson

Figure 6

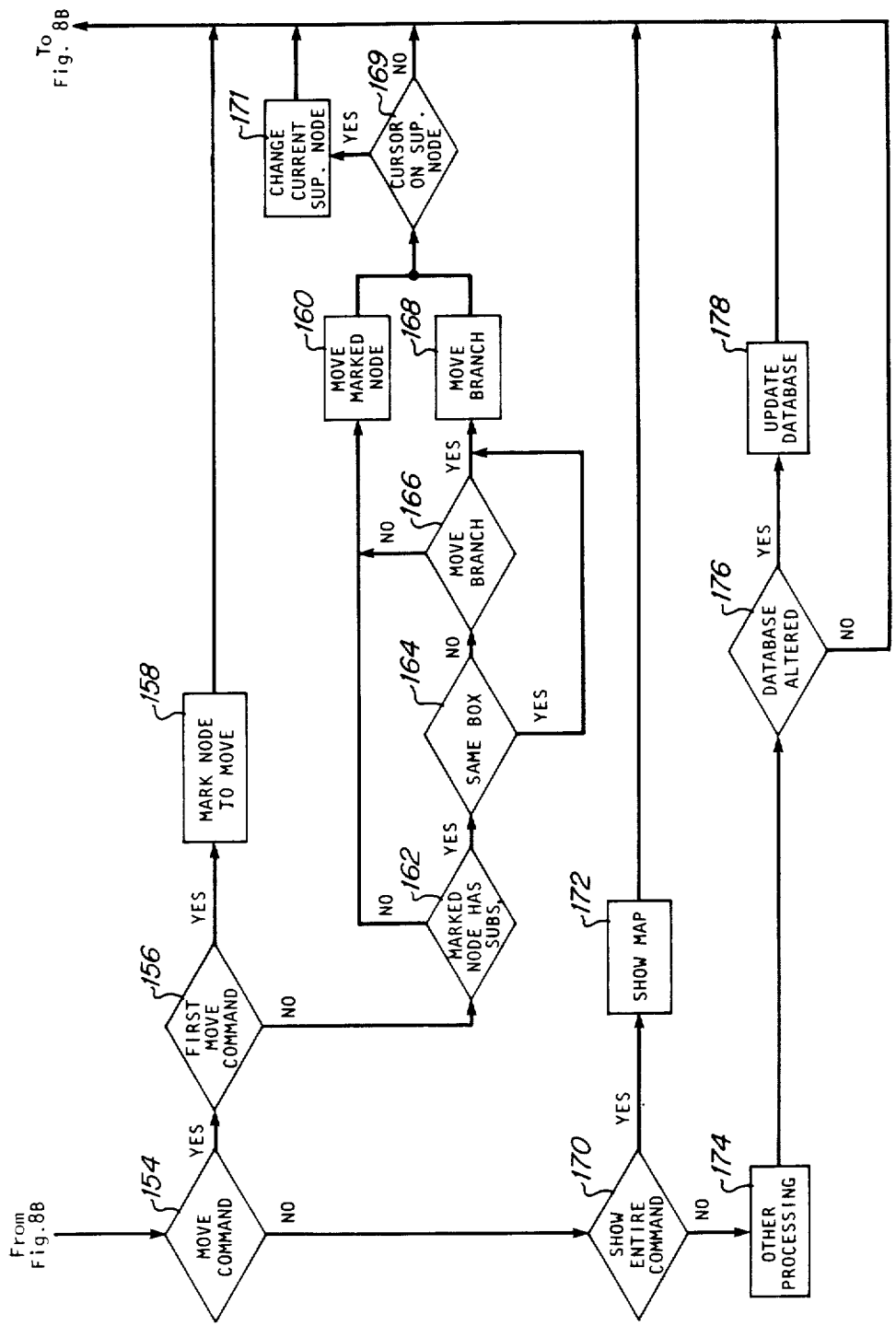

DISPLAY SYSTEM AND METHOD FOR CONSTRUCTING AND EDITING A HIERARCHICAL ARRANGEMENT OF INFORMATION

BACKGROUND OF THE INVENTION

This invention relates to user-controlled interactive computer display systems, specifically to a display system and method for constructing and editing a hierarchical arrangement of information.

PRIOR ART

In a user-controlled interactive computer display system it is desirable to insulate the user from the computer and how the computer itself works. The object is to provide a display system and method that relates directly to the work at hand, allowing the user to learn quickly how to operate the display system, then work efficiently words the completion of his or her task. This is especially important for display systems used by people who have minimal computer experience.

Proven display systems and methods exist for constructing and manipulating textual documents, freeform graphics drawings, and tables of numbers. Such is not the case for hierarchical diagrams or representations such as corporate organization charts, work breakdown structures, and decision trees.

Traditional display systems and methods for working with hierarchical representations fall into three groups: editors for an indented or subscripted list of items (such a list scheme is described by Donald E. Knuth, *Fundamental Algorithms*, Addison-Wesley, 1973), prompting systems that query the user for nodes in the representation one at a time (e.g., Diagram-Master (TM) by Decision Resources), and systems that allow the user to construct a purely graphic image of the representation (draw/paint display systems, e.g., PC Paint Plus (TM) by Mouse Systems Corp.).

These display systems and methods of the prior art have the disadvantage of requiring the user to explicity specify the positional information about a node. This is a time consuming step that must be performed repeatedly as the hierarchy is constructed and edited. The resulting error rate is high.

For applications that require a diagrammatic output such as an organization chart, the trend has been to develop display systems that allow the user to draw an image of the diagram on the display device of the computer. This technique has the advantage of being easy for the inexperienced user to understand because he is simply copying on to the display device a representation from his everyday experience. However, the other prior art systems and methods require a user to maintain the overall image of the diagram in his or her head. This is not any easy task, especially when editing the hierarchy.

Unfortunately, the price paid for ease-of-use is very high. Since the costs to process purely graphic image are prohibitively high, the user is forced to do much of the hard work of positioning the nodes, positioning the descriptive information in the nodes, and drawing the connecting lines. Consequently, the overall speed of draw/paint display systems is very slow. Draw/paint systems have other well known disadvantages: they require specialized and more expensive display hardware (which most users do not possess), editing is limited to copying or erasing then redrawing, and the information the user has painstakingly input cannot be used for other tasks. For example, a user doing an organization chart may want the computer to sum the salaries of the individuals represented in the chart. This is not possible with draw/paint systems of the prior art.

Thus, there exists a need for a new method that is intuitive to learn, quick to use, and flexible in its application.

Accordingly, it is the object of this invention to provide an improved method for displaying a hierarchy that overcomes the disadvantages of the prior art.

In particular, it is an object of the invention to accept information about the nodes of the hierarchy in a way that allows it to be stored in a database. The information can then be used for a variety of purposes once it has been entered. Another object is to place minimal demands on the hardware of the computer display system so that the broadest possible cross-section of equipment can support the invention.

Most importantly, it is an object of this invention to eliminate the need for the user to provide explicit positional information about each node. There should not even be a requirement to know that positional information exists, or how to provide it. By eliminating the need for such an expertise in constructing hierarchies, a broader selection of people can build them. By eliminating the steps associated with providing positional information, hierachies can be constructed and changed much more quickly and accurately.

SUMMARY OF THE INVENTION

A computer display system and method is disclosed that has particular application to the construction and manipulation of hierarchical representations. A computer is programmed to provide an area on the display screen where information about a single, superior node in the representation can be entered and remembered by the computer. Adjacent to this area (below in the present embodiment) another area is created where subordinate nodes can be created, identified and stored by the computer. By using a command key or menu selection in the present embodiment, the user can instantly change the contents of the display to that of any other node above, below, or beside the currently displayed node. In other words, the user can navigate around the representation at will. In such a way, a hierarchical representation can quickly be entered into the computer. The user always sees one node and its subordinate nodes. Subsequent processing can modify the nodes and their relationship to one another by editing their contents, changing their order or interconnections, performing calculations on values assigned to them, and formatting their representation for printed output.

The present invention provides such an improvement in speed, that it can be used to perform "what if" analysis not before possible on hierarchical representations. Users can quickly edit their hierarchy to compare one alternative to another.

DESCRIPTION OF THE DRAWING

FIG. 5 is a graphic representation of a frame with sample information in some of its data-entry fields; and FIG. 6 is a graphic representation of a display of index information about a sample hierarchy; FIGS. 8, 8A, 8B, and 8C comprise a logic flow diagram illustrating the operation of the preferred embodiment of the present invention.

DESCRIPTION OF THE PREFERRED EMBODIMENT

For clarity of description only, the invention will be described as embodied to produce common office organization charts. Of course it should be understood changes to the data entry field(s) such as, but not limited to, their: identification label, type (text, numeric only, multiple choice, date only, etc.), size or length, position relative to one another within their area, and quantity can make the invention appropriate for entirely different applications such as work breakdown structures, decision trees, and outlines, etc. The performance of different kinds of operations (such as statistical or arithmetic operations) on the contents of the data entry fields can also make the invention appropriate for entirely different applications.

The following definitions are applicable to the description:

Node

An element that has two types of information associated with it. Positional information that describes its spatial relationship to other nodes and descriptive information that allows it to represent something to an observer.

Hierarchy

A single topmost or root node which has no superior and an indefinite plurality (which can be zero) of subordinate nodes such that each node has one and only one immediate superior node and such that each subordinate node is in some way ordered relative to its sibling nodes (those nodes with the same immediate superior). Thus, the positional information for each node includes, at a minimum, two pieces: superior node and position relative to siblings. This type of hierarchy represents an ordered or plane tree.

Branch

A sub-hierarchy including a node and all of the directly or indirectly connected nodes below it, if any.

Frest

A plurality of hierarchies.

Figure 1:
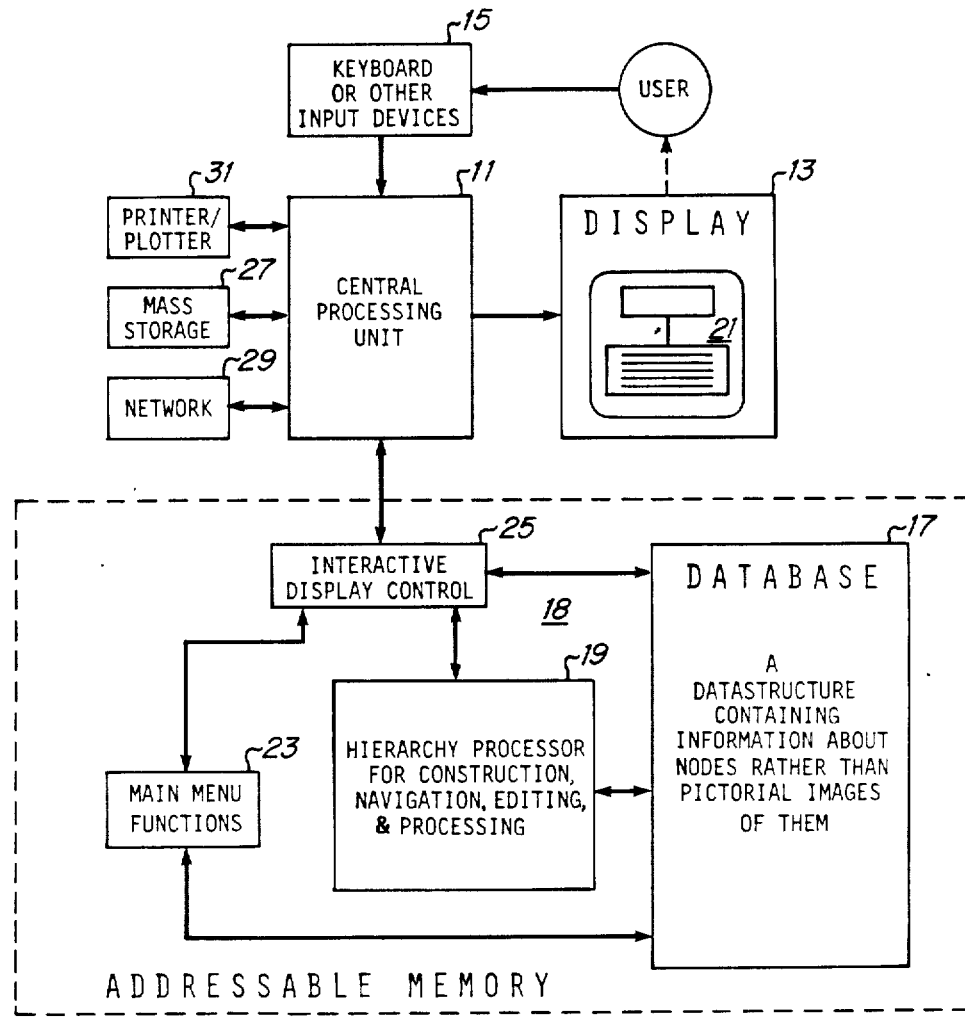
FIG. 1 is a block schematic diagram of the preferred embodient of the present invention.

Referring now to FIG. 1, there is shown a schematic diagram of the preferred embodiment of the present invention that includes a central processing unit 11 which is connected to and controls the display device 13 in response to inputs supplied to the CPU 11 via the user's manipulation of the keyboard (or mouse or other input device) 15.

Figures 2, 3, 4:
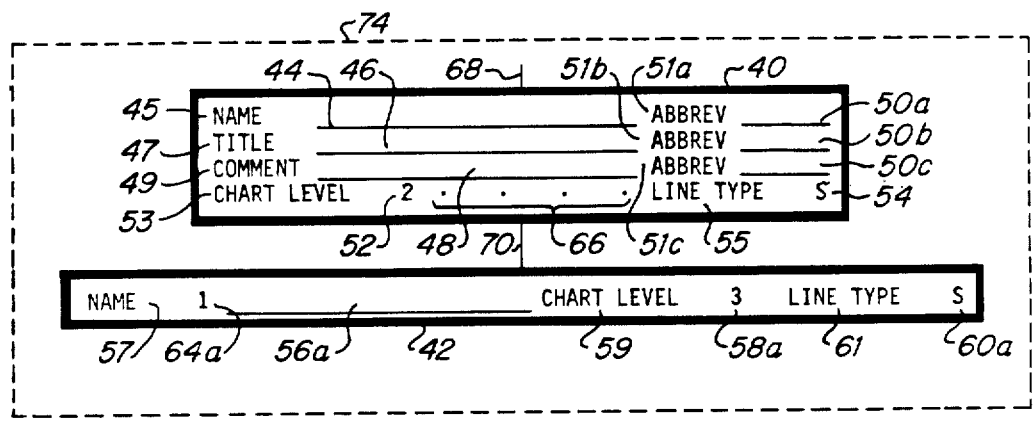
FIG. 2 is a graphic representation of a frame which displays information about a node and its subordinate nodes.
FIG. 3 is a graphic representation of a frame which displays information about a staff-level node.
FIG. 4 is a graphic representation of a frame which displays information about a terminal node at the lowest possible level of the hierarchy.

The CPU accesses addresses memory 18 which contains information that is supplied via the keyboard 15, mass storage 27, or network 29 and instructions for manipulation of that information in accordance with the operating sequences of the present invention. These operating sequences are directed toward developing a specific database 17 of hierarchical information under command of the hierarchy processor 19 (described in detail later herein). The hierarchy processor 19 interacts with the CPU 11 to display an image 21 on the display device 13 that can allow a hierarchy to be constructed and changed under control of the user. The image 21 that is displayed includes one or more primary representations of the data as shown in FIG. 2.

This representation is referred to as a frame 74. Each frame is uniquely identified by the positional information of the node whose descriptive information is displayed in the superior node box 40. In this embodiment the frame represents a work group. The term work group refers to an individual manager and the people reporting directly to him or her.

The subordinate nodes box 42 is the lower box in a frame 74. It contains an ordered list (according to the position in which they were entered) of the subordinate nodes (as identified by a subset of the information contained about them in the database) whose superior node identifies the current frame, herein referred to as the current superior node. (It is described below how indirectly connected nodes are in certain conditions listed.) The user can enter as many subordinate nodes as the current superior node has (up to 16 in the present embodiment although the number can be indefinitely large by providing means to scroll or page through additional entries). The subordinate nodes box 42 expands and contracts depending on the number of subordinate nodes. The nodes will appear in a corresponding order on the printed chart as they appear top-to-bottom in the subordinate nodes box 42 on the screen.

The fields for descriptive information, i.e., superior node name field 44, superior node title field 46, and superior node comment field 48, have self explanatory labels such as Name 45, Title 47, and Comment 49. However, they may be used for other information.

The fields for descriptive information, i.e., superior node name abbreviation field 50a, superior node title abbreviation field 50b, and superior node comment abbreviation field 50c (labeled Abbrev 51a, 51b, 51c) are for abbreviations of the information the user enters in the corresponding fields 44, 46, 48. The invention may use these abbreviations when printing the chart if there is difficulty making the chart fit on the page size requested. Entering abbreviations is entirely optional. Once the node has been created, changes to the descriptive information fields only change the descriptive information stored in the database 17 of FIG. 1.

The superior node level field 52, labeled Chart Level 53 contains positional information about a node indicating the node's level in the hierarchy. The top level is defined as 1. The topmost node's immediate subordinate nodes are at level 2 and so on. The superior node level field 52 defaults to a value one greater than the chart level for the current superior node. If the node is to be placed at an even lower level the user can specify a larger number. The user is disallowed from entering a number less than or equal to the level of the node's superior node. The specification of a number different than the default or previous value always involves creation or destruction of nodes. In the present embodiment, nodes invisible to the user (they are never displayed) are created to hold a place at each level of the hierarchy between the superior node and the actual (real-world) subordinate. Correspondingly, said invisible nodes are destroyed if the user reduces the number of intervening levels.

The invention also provides for staff level nodes, i.e., employees. A staff level node is a terminal node that cannot have subordinate nodes, consequently, the staff frame as shown in FIG. 3 is displayed differently on the display device 13. Staff level nodes are identified with an S in the node's level field 71 or 58a. Arbitrarily, the current embodiment has a limit of 99 levels. A node at the 99th level is also a terminal node displayed as shown in FIG. 4.

The value in the superior node line type field 54 of FIG. 2, labeled Line Type 55, indicates whether the current superior node is connected to its superior (in the final printed output) with a solid line (S), a dotted line (D), or no line at all (N). The present embodiment of the invention defaults to a solid line. Display of the superior node line type field 54, and label 55 is suppressed if the hierarchy's topmost node is the current superior node since that node has no node to be connected to. This field is highly peculiar to the application of the present embodiment.

In accordance with the present invention, the subordinate node name field 56a and label 57a, subordinate node level field 58a and label 59a, and subordinate node line type field 60a and label 61a contain a subset of the information describing the subordinate node. The ordinal of the subordinate node 64a shows the subordinate node's order from top-to-bottom starting with 1.

FIG. 5 shows a frame as displayed with sample information in the fields. The potential subordinate node row 62 is the bottom-most row of fields in the subordinate nodes box 42. It is not associated with any existing node and serves as a means as described below to add new nodes. It is displayed unless the maximum number of subordinate nodes is already assigned to the current superior node.

With reference to FIG. 2, the scale 66 allows the user to estimate the length in characters of the information entered into superior node fields 44, 46, and 48. The length of these fields has an impact on the printed size of the chart. The top connecting line 68 is shown if the current superior node has a superior of its own and if the line type of the current superior node is not "None". The top connecting line 68 is dotted if the line type of the current superior node is "Dotted". Staff frames have a side connecting line 69 in place of a top connecting line 68. The side connecting line 69 in FIG. 3 behaves like the top connecting line 68. The box connector 70 graphically connects the superior nodes box 40 and the subordinate nodes box 42. One bottom connecting line 72a is displayed for each subordinate node in the subordinate nodes box 42 that has at least one subordinate node of its own. Lines 68, 69, 70, and 72a help the user reference the frame to a diagram of a hierarchy such as an office organization chart.

Figure 8:
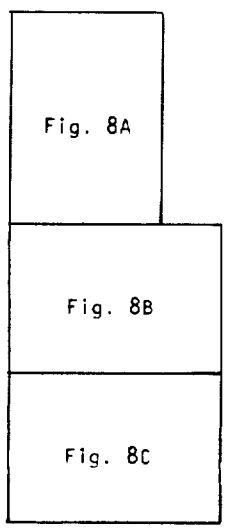
Figure 8A:
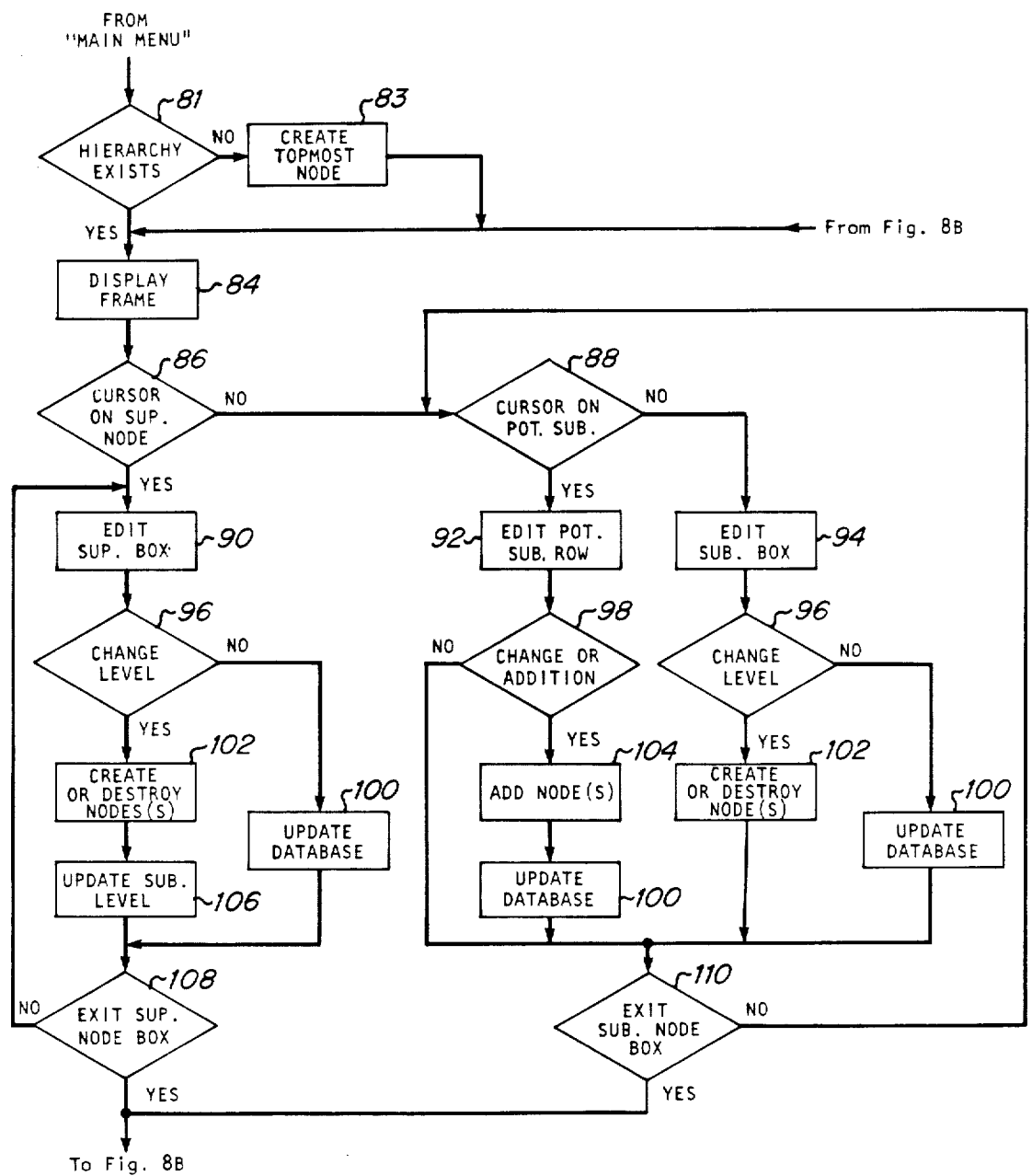
Figure 8B:
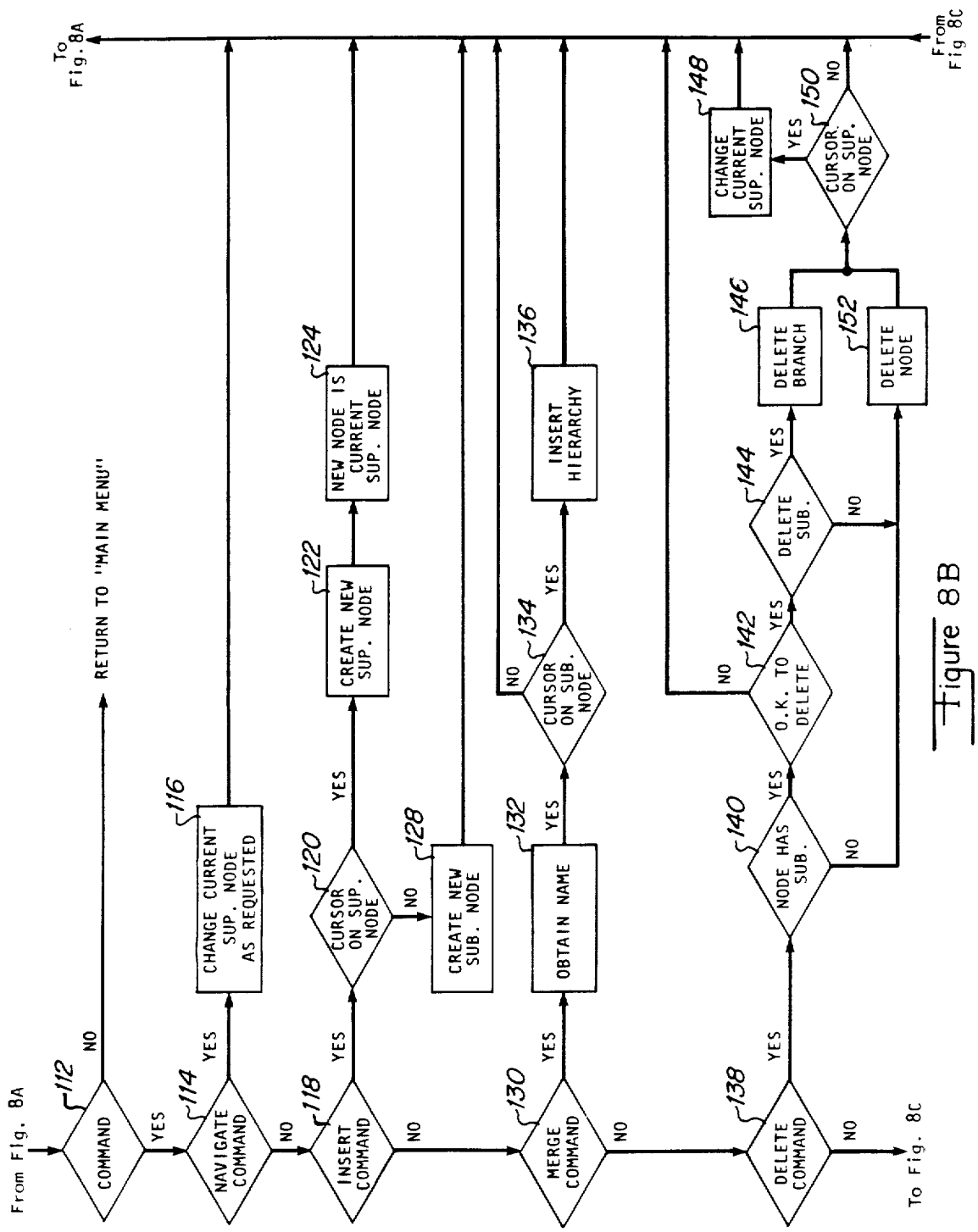

Referring now to FIGS. 8A and 8B, there is shown the overall flow through the display system. When the system is loaded into addressable memory 18, it is in the "Main Menu" state. From the "Main Menu" the user can do such things as access the mass storage 27, exit the system, or choose to work on a hierarchy. Under receiving a request from the user to work on a hierarchy there is first a test 81 to ascertain whether a hierarchy exists. If no hierarchy exists, a hierarchy is established by creating a topmost node 83. A topmost node has positional information indicating that it has no superior.

There are a large number of ways to consistently specify the positional information about this topmost node and the other nodes in a hierarchy which, in the present invention, is an ordered or plane tree. The preferred embodiment is a triply-linked data structure wherein pointers are established to a node's superior, leftmost subordinate, and adjacent right sibling. With a triply-linked data structure, a change in the positional information of one node changes the positional information of other nodes. For example, to add a rightmost node to a group of existing siblings, the new node will have null pointers to leftmost subordinate and adjacent right sibling; the pointer to the node's superior will hold the address of the current superior node. Additionally, the new node's left sibling must have its adjacent right sibling pointer changed from null to the address of the new node as entered in the database 17. This approach provides extremely high speed when polling the database 17 (even to find the left adjacent sibling for which there is no pointer is a quick calculation) with some speed penalties when changing the positional information. The trade-off is favorable because polling is an extremely frequent activity while changing the positional information is rare and generally performed when speed is not an issue.

Manipulation of a triply-linked data structure is well covered by the literature (see for example, Knuth, *Fundamental Algorithms*).

Alternatively, a four-way-linked data structure could be used to describe the positional information of each node. To the three links described above we would add a link to the left adjacent sibling. This would speed operations where the finding the left adjacent sibling was important, but the additional storage overhead and added complexity in changing the positional information may make this alternative data structure less attractive than the embodiment described above. On the other hand, a doubly-linked structure would be sufficient to define our hierarchy (we would give up from the triply-linked structure the pointer to leftmost subordinate), but it is believed the processing burden for many common operations would result in unacceptable performance. Though not favored, these and other data structures can be used to implement the invention.

A memory allocation scheme is used in developing the database 17 according to the present invention. A fixed array of C-language structures which include positional and descriptive information (name, title, comment, etc.) is defined and allocated. Pointers to the elements of this array are used to initialize a stack. A pop routine indicates the next available structure when a node is created. A push routine returns the memory space from a destroyed node back to the available pool of memory space. The C-language function malloc could alternatively be used to allocate and assign memory for the information.

Node creation in the database 17 refers to obtaining a pointer to an available block of memory from the stack and storing the proper positional information at that location. Node destruction refers to erasing the contents of the memory block and pushing the pointer to the block back on the stack. Updating the database, as later discussed, is a more generic operation which includes updating both the positional and descriptive information about the node as required.

Referring again to the flow chart of FIGS. 8A and 8B, at this time, the topmost node has no subordinate nodes or descriptive information about itself (other than default values of information as applicable). The topmost node is designated as the current superior node.

In all cases, a hierarchy 81 now exists and a current superior node has been designated. System flow proceeds to the functional block that generates the screen image of a frame 84. Specifically, the database 17 is polled for descriptive information about the current superior node and that information is displayed in the appropriate fields on display device 13. Then the database is polled for the subordinate nodes of the current superior node (if any) and the required descriptive information about them. This information is displayed in the subordinate nodes box 42. A potential subordinate node row 62 is also displayed in the subordinate nodes box 42 if the current superior node has fewer than the maximum number of subordinate nodes. This row has only default descriptive information in its fields; it is not associated with a node. Other background information that may be desired to complete the image of a frame is generated and displayed.

If the current superior node has just been changed, the cursor is placed in the superior node name field, else its position depends on the previous history of the system.

User input and editing within a given field is handled with a buffered editor that waits for and responds to user edits, but does not update the database until the field is exited. System behavior depends on the field in which the editor is called as described below.

If the cursor 86 is in the superior node box 40, the editor is called for the appropriate field and the system awaits user input. If the edits make a legal change 96 in the superior node level field 52, then the appropriate number of nodes will be created or destroyed 102 and the subordinate node level field(s) 58a values will be updated 106. Edits to other fields will result in simple updates 100 to the database 17. If the cursor 88 is in the potential subordinate node row when the field editor is called 92, any change or addition 98 results in the creation/addition of at least one node 104, more if the subordinate node level field 58a is legally changed. The database 17 will be updated 100 if information is added to the subordinate node name field 56a. If the cursor 88 is elsewhere in the subordinate nodes box 42, the editor 94 is called for the appropriate field. If the edits make a legal change 96 in the subordinate node level field 58a, then the appropriate number of nodes will be created or destroyed 102. Edits to other fields will result in simple updates 100 to the database 17.

If the user exits field editing 180, 110 with a keystroke that moves the cursor to another field in either the superior node box 40 or the subordinate nodes box 42, then a small loop is made to resume editing at the chosen field. Otherwise all possible paths of flow rejoin and a test is performed 112 to establish whether the user wants to invoke a command. If the test fails, the flow returns to the "Main Menu" operating state. If the user has chosen to invoke a command 112, flow passes through a series of tests 114, 118, 130, 138, 154, 170 to identify the particular command. A description of each command follows:

The user can navigate from one frame 74 to another. The navigation operations 116 are several in number. At the user's direction, they can show the frame of the node at the same level to the left or right of the current superior node, to the frame of the current node's superior, to the frame of the topmost node of the hierarchy, or to the frame of one of the current node's subordinate nodes. If the current frame is already at the extreme of the selected navigation direction, the display image remains unchanged.

If the cursor is in the superior node's box 40 when the command to navigate down is invoked, the frame of the superior node's leftmost subordinate node (at the highest level of subordinate nodes) will be displayed. If the node identified in the superior node's box 40 has no subordinate nodes, the leftmost frame of the next lower level will be displayed. These conventions for navigating down in the hierarchy are arbitrary and could be modified as desired to establish different conventions. In the present embodiment, animation is used to slide portions of the new frame images into place from the appropriate direction. This enhances the users illusion that he is actually moving about a hierarchy.

The user can also navigate directly to another frame by making a randomly chosen node the current superior node. In the present embodiment this is possible by choosing a navigation command to display a list of the nodes alphabetized by the first field of descriptive test FIG. 6. The invention will navigate directly to the node selected by the user.

All of the navigation commands operate by changing the value 116 of the memory address (a pointer in the C-language) that identifies the node known as the current superior node. The system loops to the display frame step 84 and places the cursor in the top, leftmost field 44 of the new current superior node's frame 74. The user has the impression that the representaiton of the entire hierarchy can move at his command while at any one time he views a portion (the frame 74) through a window.

The command to insert 118, the creation of a new node at the cursor location, has a behavior that depends on the box in which the cursor is currently located. If the cursor 102 is anywhere in the superior node box 40 when the insert command is invoked, a node will be created above the current superior node 122 with appropriate changes to the positional information of attached nodes. The new node becomes the current superior node 124 and the screen is updated. The new image of the superior node's box 40 will of course be empty of descriptive information other than defaults peculiar to the application of the present embodiment. All nodes directly or indirectly subordinate to the new node will be moved down in the hierarchy one level. If the cursor 120 is anywhere in the subordinate nodes box 42 when the insert command 118 is invoked, a node will be created 128 between the node the cursor is on (or the potential subordinate node row 62) and the one above it (if one exists). The cursor will stay on the new node which will have no descriptive information other than defaults peculiar to the application of the present embodiment. The positional information of the new node's siblings will be adjusted appropriately.

The present invention allows hierarchies to be merged in a manner similar to insertion of a new node. Another hierarchy selected by name 132 (from the mass storage 27 in the current embodiment) is merged by inserting 136 it's topmost node at the current cursor location. This process follows the conventions of the insertion operation except that the sursor 134 must be in the subordinate nodes box 42 (as an arbitrary restriction according to the preferred embodiment).

The delete command 138 destroys the existence of the node the cursor is on. If the node the cursor is on has subordinate nodes 140, the user is asked to specify 144 whether the subordinate nodes are also to be deleted. If the user requests that subordinate nodes be deleted, the node the cursor is on defines the top of a branch which is deleted 146. If the user does not want to delete the subordinates, the subordinate nodes are inserted in order as subordinate nodes of the deleted node's superior 152. In all cases, the positional information of previously attached and still existing nodes is updated 146, 152. The current superior node is unchanged if the cursor 150 was located in the subordinate nodes box 42. If the cursor was in the superior node box 40, the topmost deleted node's superior becomes the current superior node 148. There must be one and only one topmost node in each hierarchy. The preferred embodiment of the invention cannot handle a forest of hierarchies at one time. For that reason the topmost node in the hierarchy can be deleted only if it has exactly one subordinate node connected directly 142. In contrast, if the topmost node, having several subordinate nodes, were deleted as an individual, that would result in those subordinate nodes being topmost nodes in several independent hierarchies.

The move command 154 is a two step process in the preferred embodiment. The user first invokes the move command 156 when the cursor is on the topmost node of the branch to be moved 158. Then the user moves the cursor to the location where the topmost node of the branch previously identified is to be inserted and invokes the move command once more. If the branch to be moved has move than one node 162 and the cursor 164 is not in the same subordinate nodes box 42 as that of the topmost node of the branch to be moved, the user is asked whether to move the entire branch or just the topmost node 166. If the user requests to move just the topmost node, a negative choice at 166, that action is performed 160. The convention in the current embodiment is to leave a node without descriptive information in the moved node's place to which the moved node's previous subordinates are connected. Otherwise, the entire branch is moved 168. The positional information of all affected nodes on both ends of the operation is updated 160 and 168 (the conventions used to update the positional information of the moved node are the same as for inserting a new node). If the cursor is in the superior node box 169, then the moved node becomes the current superior node 171.

Figure 7:
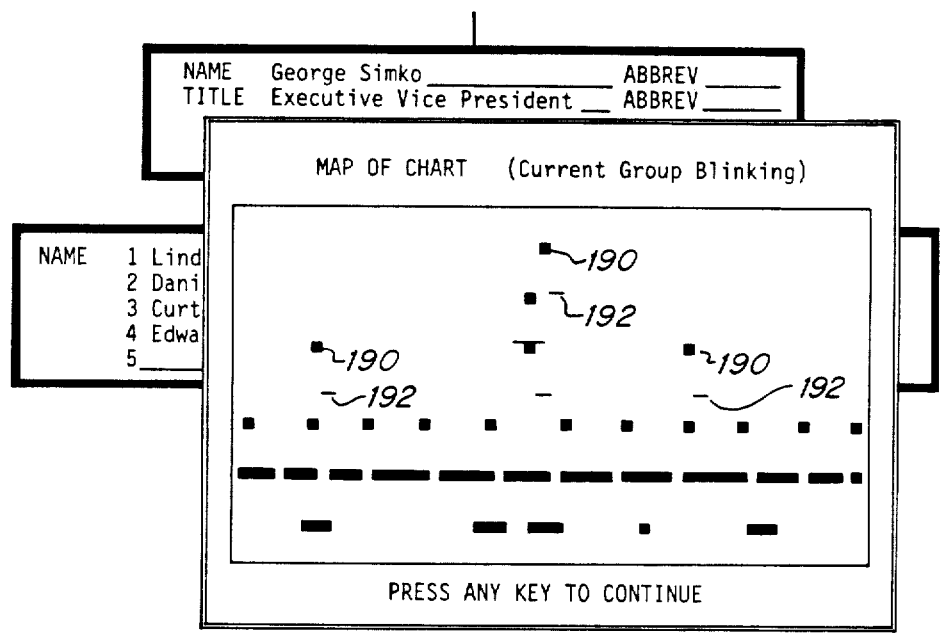
FIG. 7 is a graphic representation of a display of a map of a sample hierarchy.

The Show Entire Chart command 170 displays a map of the hierarchy in the form illustrated in FIG. 7. It is very useful for viewing where the current superior node is with regard to the rest of the hierarchy. A window is made to appear over a part of the current frame. Each regular node will appear as a small square 190. Each staff node will appear as a dash 192. The current superior node may be made to blink on and off.

Other conventional operations may be included such as saving the hierarchy to mass storage 27, retrieving a hierarchy from mass storage 27, erasing the entire hierarchy, or processing the data 17 constructed according to the invention (for example, to format and print an organization chart). It is also possible in the current embodiment to perform most of these operations on part of the hierarchy by identifying the topmost node to be processed and by indicating how many levels down from that node to process.

As an additional disclosure, the User's Guide for the present embodiment of the invention is included below as an appendix. It should be noted that the User's guide uses slightly different terminology for its description because it was written for a non-technical individual. Nodes are referred to as employees, persons, or positions and superior nodes are referred to as managers. Navigation is referred to as "moving between work groups" and the merging of two charts is referred to as appending.

The present invention as configured may be used to build an office organization chart. During operation, the user is presented with a manageable piece of what can be an indefinitely large hierarchy. The user can make changes to this piece without having to consider the effect of these changes on other parts of the hierarchy. In fact, the user does not even need to known that his changes will have an effect. The system stores information about the entire hierarchy and makes changes as necessary, based on the user's modifications. Once the user has established the structure of the hierarchy, global operations such as formatting and printing an organization chart can be performed as if the user was operating on a single node.

In particular, the user can add a node simply by typing a name into the potential subordinate node row 62 under the appropriate manager. This is intuitive to the user because the frame displayd to him effectively represents an organization chart even though it is not. The most important point is that the user's intended action is unambiguous to the system; the system knows that the current superior node defines the superior node pointer and the system can calculate the sibling pointers since it is known that the additional node is the rightmost of the existing subordinates. Therefore, the positional information about the node is implicitly extracted from the user and automatically recorded by the system. The user is not even required to known that a node has positional information, nor is the user required to know the rules of constructing a hierarchy from nodes. The expertise in these arcane matters is subsumed by the system and method, freeing the user to concentrate on the task at hand.

In addition, configuring such a hierarchical chart requires fewer steps than in the prior art wherein the position information must be explicity stated by the user. Thus the prior art requires more steps that must be learned and repeated for every iteration.

Similar advantages are obtained when inserting, merging, or moving nodes. It is intuitive to the user that a request to perform a node insertion when the cursor is in the superior node box 40 of the frame 74 will result in a new node being placed above the superior node. On the other hand, if the cursor is in the subordinate nodes box 42 of the frame 74, it is intuitive to the user that a request to perform a node insertion will result in a new node between the existing adjacent nodes. The system has all the information it requires since the cursor location on the display device 13 uniquely defines the nodes affected by the insertion. In the prior draw/paint art, wherein an actual graphic image of the hierarchy is being worked on, it would be ambiquous to the user and to the system which type of insertion was to occur because these prior art systems don't distinguish between the two types of nodes (current superior node or subordinate node) at any one time. Additional commands are required, lengthening the learning process and/or the time to perform the operation. In fact, it is common that an insertion in the draw/paint prior art requires the user to manually move or erase and redraw portions of the hierarchy to make room for a new node.

User's Guide
Program and Documentation by Kenneth Lafferty Hess
Dedicated to Connie Irish-Hess © Copyright 1985, 1986 Banner Blue
All Rights Reserved Second Edition (January 1986)

Changes are periodically made to the information contained in this guide. These changes will be incorporated in new editions of the guide.

Your questions and comments about the program and documentation are welcome.

> Banner Blue
> P. O. Box 7865
> Fremont, CA 94537
> (415) 794-6850

IBM is a registered trademark of International Business Machines Corporation

Sideways is a trademark of Funk Software, Inc.

| | | |
|---|---|---|
| Chapter 4 | Other Functions | 4-1 |
| | Append Chart | 4-1 |
| | Delete Position | 4-2 |
| | Insert Position | 4-3 |
| | Move Position | 4-4 |
| | Print Part | 4-6 |
| | Print to Disk | 4-6 |
| | Save Part | 4-7 |
| | Show Entire Chart | 4-7 |
| | Show Top Work Group | 4-7 |
| | Options | 4-8 |
| Appendix A | Key Assignments | A-1 |
| | Editing Text in a Field | A-1 |
| | Selecting Menu Items | A-1 |
| | Moving Between Fields | A-2 |
| | Selecting Commands | A-2 |
| Appendix B | Tips on Making a Large Chart | B-1 |
| | Name Length | B-2 |
| | Vertical Lists | B-4 |
| | Abbreviations | B-4 |
| | Other Tips | B-6 |
| | When It's Too Big | B-6 |
| Appendix C | Memory Utilization and Other Org Limits | C-1 |

Index

Contents

| | | |
|---|---|---|
| Chapter 1 | Introduction to Org | 1-1 |
| | What Can Org Do | 1-1 |
| | What Equipment and Software are Needed | 1-3 |
| | README | 1-3 |
| Chapter 2 | Getting Started | 2-1 |
| | Copying the Org Diskette | 2-1 |
| | Starting a One- or Two-Diskette Drive System | 2-3 |
| | Installing Org on a Fixed Disk | 2-3 |
| | Starting a Fixed-Disk System | 2-4 |
| | Configuring Your System | 2-5 |
| | Exiting Org | 2-8 |
| Chapter 3 | Building an Organization Chart | 3-1 |
| | Commands | 3-1 |
| | Making Choices | 3-1 |
| | Getting Help | 3-2 |
| | Backing Out | 3-2 |
| | Some Essential Terms | 3-2 |
| | Starting a Chart | 3-6 |
| | Editing Fields | 3-7 |
| | Adding Subordinates To the Work Group | 3-8 |
| | Additional Work Groups | 3-9 |
| | Moving Between Work Groups | 3-11 |
| | The Command Menu | 3-13 |
| | Printing a Chart | 3-14 |
| | Saving a Chart | 3-17 |
| | Erasing a Chart | 3-18 |
| | Retrieving a Chart | 3-18 |

1 Introduction To Org

What Can Org Do

With Org you can automatically generate organization charts that can be printed on most printers. As you enter the names of managers and their subordinates, Org obtains all the information it needs to produce complex organization charts. Org draws boxes and connecting lines with perfect spacing. Org automatically centers the text in all of the boxes and obeys rules of organization chart protocol. You don't need to draw a thing, Org does it for you!

In addition, Org gives you a complete set of editing capabilities to insert, delete, and move employees or groups of employees within your chart. You can also print pieces of a chart or connect one chart to another. Org will even help you fit a big chart on a smaller piece of paper.

Org lets you have staff level employees and employees that are removed by more than one level from their manager. You can also supply a title, subtitle, and footnote for your chart. You can print your chart without boxes or connect an employee to his or her manager with a dotted line if you like.

Org does all of this without special graphics hardware. You can use almost any IBM PC configuration.

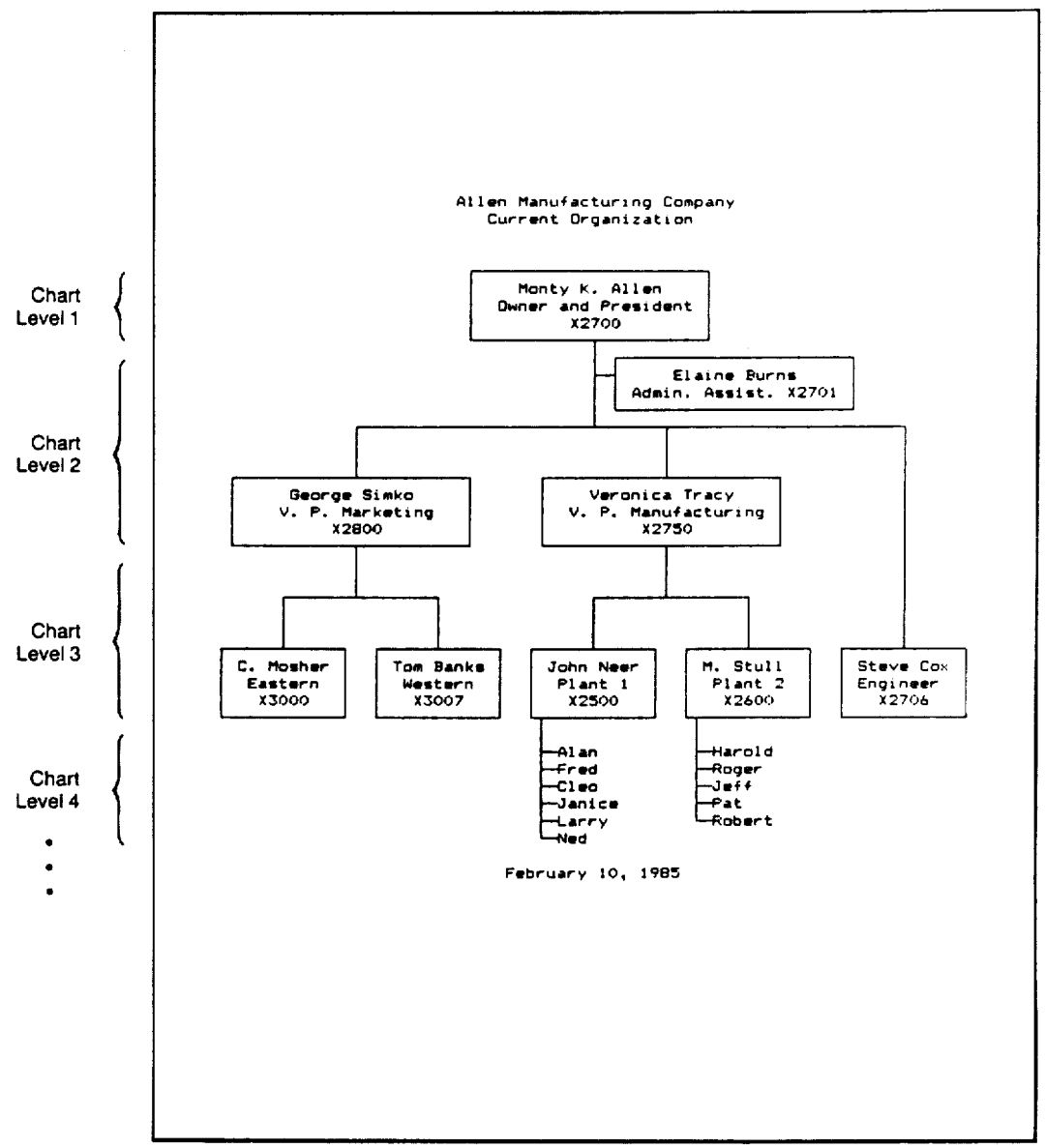
A typical organization chart
1-2  Introduction To Org

What Equipment and Software are Needed

Org requires an IBM Personal Computer or 100% compatible computer with at least 192KB of memory and a double-sided diskette drive.

You also need the following:

- IBM or IBM compatible 80-Column Color or Monochrome Display
- IBM Disk Operating System (DOS) Version 2.0 or above
- A printer

Note: If your computer has only 128KB of memory (except for PC*jr*), you can use a special version of Org with DOS 2.0 or 2.1. See "Getting Started" for instructions on using this special version.

README

The Org diskette also contains a program named README. This program allows you to read additional information about Org. The information is not essential to using Org, but you may find it useful if you are having a printer problem or if you want to do something special (like print using Sideways™).

Follow these steps to read this information:

1. Make sure DOS is loaded and the DOS default drive prompt is on your screen. In other words, if your default drive is A, the prompt on your screen is A>.

2. Insert the Org program diskette in your default drive.

3. Type readme and press Enter [↵].

4. Use the [↑] and [↓] and [PgUp] and [PgDn] keys to scroll through the information.

5. Press [Esc] to exit the program and return to DOS.

Note: The same information is contained in the ASCII file README.DOC.

2 Getting Started

This chapter contains information and procedures you need to start using Org.

Copying the Org Diskette

You should make a working copy of the Org diskette before you use the Org program.

You need these additional items to make a working copy:

- A diskette containing DOS (if DOS is not installed on your fixed disk)
- One double-sided, blank diskette Follow these steps to make a working copy of your Org diskette:

1. Make sure DOS is loaded or installed on your default drive and the DOS default drive prompt is on your screen. In other words, if your default drive is A, drive A contains your DOS diskette and the prompt on your screen is A>.

2. Type diskcopy a: b: and press Enter .

Getting Started   2-1

3. Follow these steps:
   a. Remove the DOS diskette and insert the Org program diskette in drive A. It is your source diskette.
   b. If you have two diskette drives:

Insert a blank diskette in drive B. It is your target diskette.

If you have one diskette drive:

Proceed to step c. DOS will tell you when to insert the blank diskette. It is your target diskette.

The blank diskette does not need to be formatted. The DISKCOPY command formats the disk and erases any previously stored information.
   c. Press any key to begin copying.

When copying is complete the following message will appear on your screen: Copy another (Y/N)?
   d. Type N 4. Remove the diskettes.

5. With a soft-tip pen, label the target diskette Org Working Copy.

6. Store the Org program diskette in a safe place and use the working copy for all other procedures in this book.

Starting a One- or Two-Diskette Drive System

If you have a system with one or two diskette drives (without a fixed disk), proceed as follows:

1. Make sure the DOS default drive prompt is on your screen. For example, if your default drive is A, the prompt on your screen is A>.

2. Insert the Org diskette in the default drive.

3. Type org and press Enter ⏎. You can type org in either lowercase (small) letters or uppercase (capital) letters. (If your system has only 128KB of memory, type org128 instead.)

After several seconds you see the Org Main Menu and copyright notice. This screen also tells you what version of the program you have.

If this is the first time that you are running Org, you should proceed to the section "Configuring Your System."

Installing Org on a Fixed Disk

Make sure that you have installed DOS on your fixed disk before you begin.

Then follow these steps to install Org on a fixed-disk system (such as a PC XT):

1. Make sure the DOS default drive prompt is on your screen. For example, if your default drive is C, the prompt on your screen is C>.

2. Insert the Org program diskette in the A drive and close the door. Then type a:fd and press Enter ⏎. (If your system has only 128KB of memory, type a:fd128 instead.)

3. A message will be displayed while Org installation is taking place.

4. When installation is finished, remove your Org diskette and store it in a safe place.

Starting a Fixed-Disk System

If you have a fixed disk (such as a PC XT), make sure that both DOS and Org are installed on your fixed disk, then follow these steps to start using Org:

1. Make sure the DOS default drive prompt is on your screen. For example, if your default drive is C, the prompt on your screen is C>.

2. Type org and press Enter . You can type org in either lowercase (small) letters or uppercase (capital) letters. (If your system has only 128KB of memory, type org128 instead.)

After several seconds you see the Org Main Menu and copyright notice. This screen also tells you what version of the program you have.

If this is the first time that you are running Org, you should proceed to the section "Configuring Your System."

Configuring Your System

Org needs some basic information about your printer and the disk drive you will be using. This information will be saved from work session to work session, so you do this procedure only once.

If you haven't already done so, start Org as described in the section "Starting a One- or Two-Diskette Drive System" or "Starting a Fixed-Disk System." Then follow these steps:

1. Select Configure System from the Main Menu. You can press the Cursor Down ↓ key until Configure System is highlighted and then press the Enter ↵ key, or you can type the letter C. A list of printers will be displayed.

2. Select your printer:

a. If your printer is listed by name, use the Cursor keys, ↑ ↓ → ←, to select your printer and press Enter ↵.

b. If your printer is not listed by name, use the Cursor keys, ↑ ↓ → ←, to choose one of the selections named Other. The Other printers are grouped in two categories: 80 column printers that print on letter size paper and wide printers that print on paper as large as 14 inches wide. Select the one that prints the same number of characters per inch (cpi) as your printer and press Enter ↵.

Configuration — Page 2 will be displayed.

Note: Some printers do not have the capability to print smooth solid lines. For the selections named Other, Org assumes that this is the case. Thus, your printed output will appear in one of two ways:

Printer with Graphics

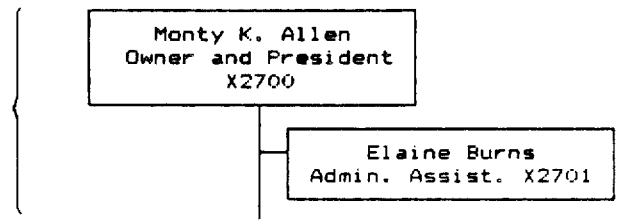

Printer without Graphics

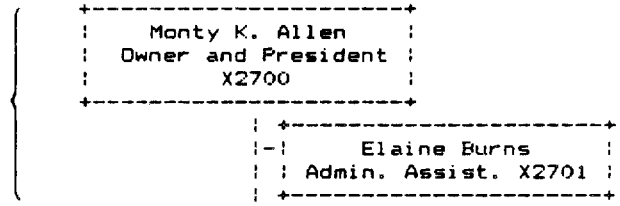

If you have a letter quality printer with a 10 or 12 cpi typing element, you may want to consider purchasing a 15 cpi element. A 15 cpi element will allow you to put a larger chart on the same size piece of paper.

3. If your system has more than one connection for a printer, the first choice will be labeled Print To. Use the Cursor Right key [→] to select the connection to the printer chosen above and press Enter [↵].

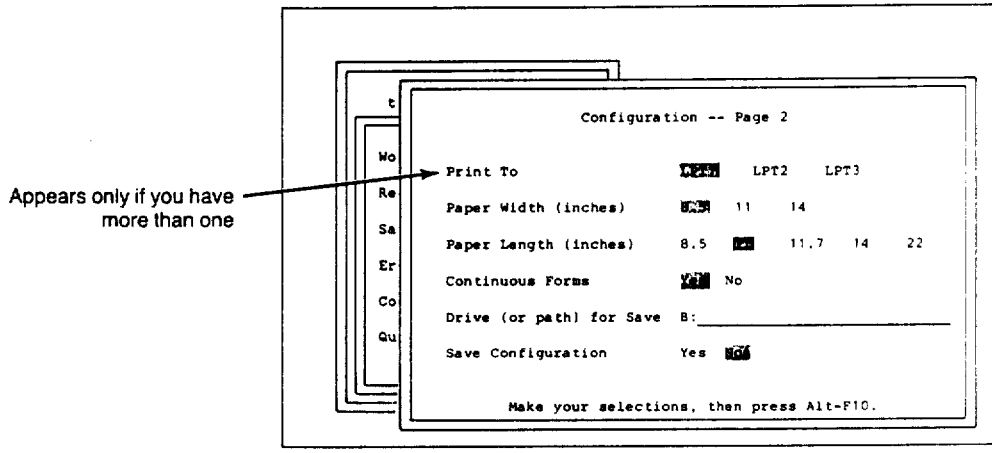

Appears only if you have more than one

Caution: Org does not support printers connected to an IBM Asynchronous Communications Adapter (sometimes known as a serial communications port). If you try to print to such a printer, you will receive an error message. You can print to a disk file or use DOS MODE redirection (see your DOS manual).

4. The first choices for systems with only one printer connection will be Paper Width and Paper Length. Use the Cursor Right key [→] to select the width of the paper in your printer and press Enter [↵]. Do the same to select the paper length.

5. The next choice is labeled Continuous Forms. If your printer uses continuous forms (each sheet of paper is connected to the next one) select Yes and press Enter [↵].

If you must manually insert single sheets of paper into your printer, select No and press Enter [↵].

6. The next line is labeled Drive (or path) for Save. Type the drive you want to save organization charts to. For most two-diskette systems this would be B: For most fixed-disk systems type in C:

Note: Path is an advanced DOS command. Its use is optional and most people can ignore it.

Make sure all of your selections are correct. If not, you can use the Cursor keys [↑] [↓] to return to a line and change the selection.

7. Then, for the last line labeled Save Configuration select Yes and press Enter [↵] (or press and hold [Alt] then press [F10] ).

All the information you just entered will be saved on the program disk or diskette. Org will automatically get this information each time you start the program.

Note: If you want to make a temporary change in the configuration follow the above steps, but select No for Save Configuration. Org will forget the new settings when you exit the program.

Exiting Org

You can exit from Org by selecting Quit from the Main Menu.

To select Quit, press Cursor Down [↓] to highlight Quit on your menu and press Enter [↵], or type the letter Q.

Org will check to make sure that you have saved any chart which you may have modified. If you have not saved your chart, Org will warn you that the chart will be erased. Select Yes to erase the chart and exit to DOS. Select No to return to the Main Menu for another chance to save your chart.

3 Building An Organization Chart

After covering some basics about the use of Org, this chapter will take you step-by-step through the construction of an organization chart.

Commands

Commands tell Org what you want to do next. You will learn the most important commands in this chapter.

Most commands are initiated by pressing one of the function keys. These keys are labeled [F1] through [F10]. On the IBM PC, the function keys are located at the left side of the keyboard. Sometimes it is necessary to press and hold [Alt], then press the function key (for example, [Alt] - [F2] ).

After you initiate a command, Org frequently displays a menu or question with several possible answers to choose from.

Making Choices

When Org presents you with a menu or "multiple-choice" question, you can respond in either of two ways:

- You can highlight the choice by using the Cursor keys, [↑] [↓] [→] [←], then press Enter [↵].
- Or you can type the first letter of the choice.

From now on in this guide, when we ask you to make a choice or a selection you may use either method of making the choice.

Getting Help [F1]  You can press [F1] for help at any time.

A Help window will overlay part of the screen you are using. The Help topic will be the one judged appropriate given where you are. You can choose any other Help topic by making a selection at the bottom of the Help window.

Some help topics fill more than one window. A message will appear telling you there is More. You can scroll through these long topics using [PgUp] and [PgDn] or the Cursor keys [↑] [↓].

Exit help by selecting Exit or by pressing [Esc].

Backing Out [Esc]  You can press [Esc] to back out of Org one step at a time. If you keep pressing [Esc], you will reach the Main Menu. Then select Quit to return to DOS.

Some Essential Terms  In this section, we explain some terms to describe how Org is used.

Work Group

The term work group refers to an individual manager and the people reporting directly to him or her. A work group is the building block that Org uses to construct large organization charts. Org displays one work group on the screen at a time

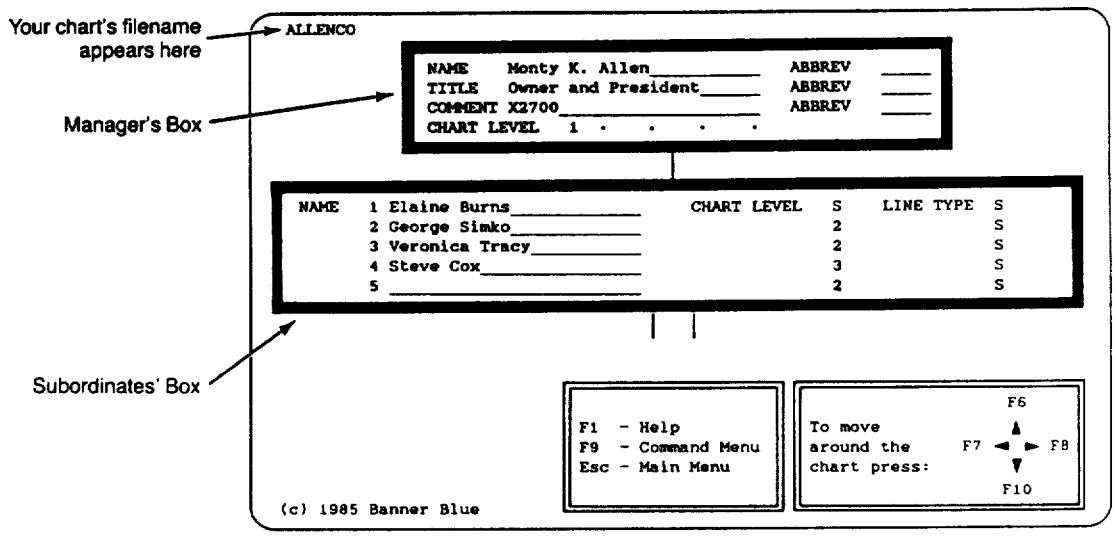

A Work Group

Manager's Box

In the work group display, the box at the top is referred to as the manager's box. It contains information about the manager of the work group. If the person has no subordinates, the work group will consist only of the person in the manager's box.

Subordinates' Box

The subordinates' box is the lower box in a work group. It contains a list of the people who report directly to the person in the manager's box.

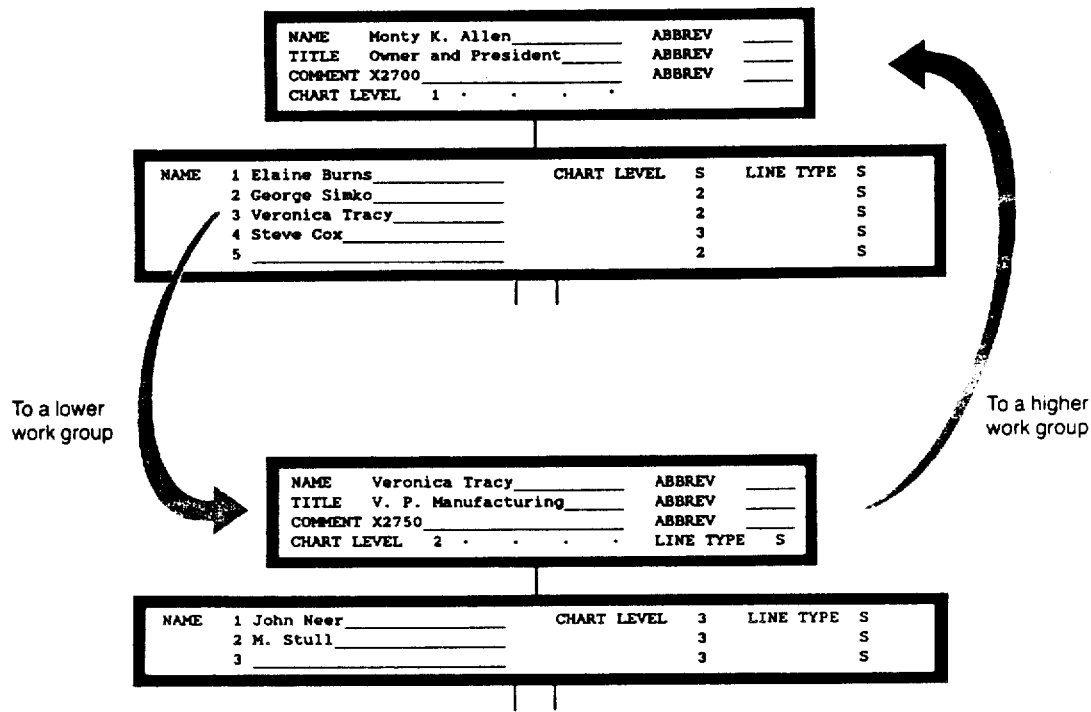

Moving around the chart

Moving Around the Chart

The term moving around the chart refers to the process of changing from the display of one work group to that of another. This gives you the capability of working with larger charts than can fit on your display at once.

Org lets you move around your chart just as if your organization chart were laid out in front of you. You can move up, down, and sideways to see work groups at higher, lower, or the same level of your organization.

Staff Level Employee

The term staff level employee refers to a special location on the printed organization chart. Staff level employees are printed between a manager and his or her other subordinates. Many organizations like to place secretaries and administrative assistants in this special location.

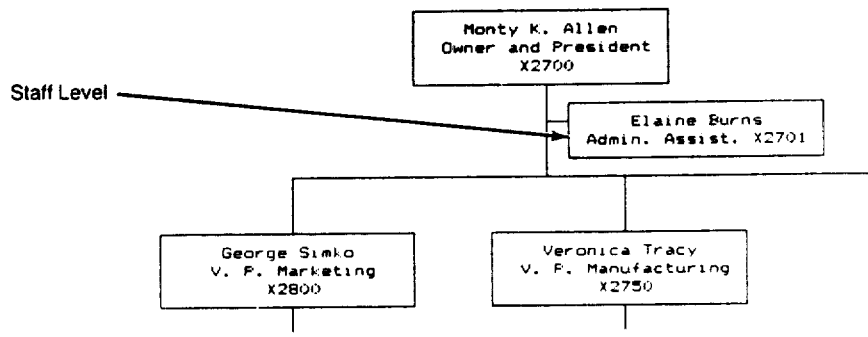

Vertical Listing of Subordinates

At the bottom level of a chart, subordinates are sometimes listed above one another rather than side-by-side. This is referred to as a vertical list.

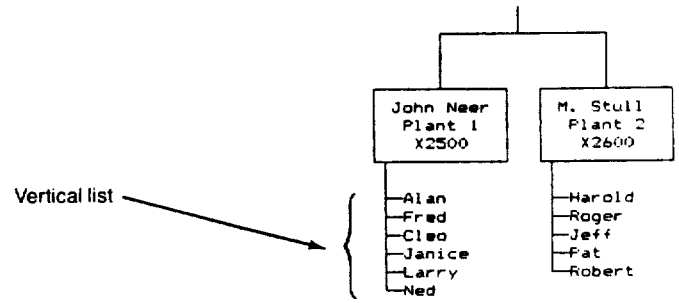

Building An Organization Chart  3-5

Starting a Chart  This section describes how to start a chart from scratch. If you have a one- or two-diskette drive system (rather than a fixed disk), make sure you have a formatted diskette available to save your chart.

Then, follow these steps:

1. Select Work on Chart from the Main Menu. Org will display a box which represents the topmost position in your organization.

2. Type the name of the topmost manager and press Enter . (This is not the place to type the chart title, that comes later.)

Org now displays a work group. At the top is the person's name you just typed.

The work group, a manager with his or her subordinates underneath, is the primary building block for constructing an organization chart. The important thing about a work group is that all of the subordinates report directly to the manager at the top of the screen.

All information in the box at the top of a work group pertains to the manager. The choice of how much information to enter is entirely your own.

The fields (areas that you type into) labeled Name, Title, and Comment are self explanatory. However, they may be used for other information if you want.

Sometimes two people share a position. In this situation you can type one person's name *and* title in the Name field and the other person's in the Title field. In some cases you may want to make a chart without people, using only the names of departments or divisions. Or you may want to make a chart with a mix of departments and people. It's up to you. Throughout this 3-6   Building An Organization Chart guide we will assume, however, that you are constructing a chart of managers and their subordinates — work groups.

The fields labeled Abbrev are for abbreviations of the information you enter in the respective Name, Title, and Comment fields. Org may use these abbreviations when printing your chart if there is difficulty making the chart fit the size you request. Entering abbreviations is optional.

The Chart Level field indicates a position's level in the organization. The top level is defined as 1. Don't worry if your organization numbers their levels differently. The levels don't print out on the final chart. However, you will need to follow Org's conventions while using the product.

Editing Fields

To edit the topmost manager's name or any other field, use the standard IBM PC editing keys:

- Cursor Left [←] or Cursor Right [→] to move character by character without erasing.

- Backspace [←] to back up and erase the previous character.

- Insert [Ins] to enter insert mode for squeezing characters between those already there. (Your cursor changes to a small block to let you know that you are in insert mode.) Press [Ins] again to turn insert mode off.

- Delete [Del] to delete characters to the right, one-by-one.

Press Tab [→|] to move out of the Name field to the Abbrev field to the right. The Tab key will always move you from field-to-field left-to-right. If you are already in the rightmost field, it will move you to the first field of the next row. Reverse Tab [|←] will move you from field-to-field in the opposite direction.

To move to a field directly above or below your current location in the box, use the Cursor Up [↑] or Cursor Down [↓] keys.

Fill in as much information about the topmost manager as you want, then you will learn to enter his or her subordinates.

Building An Organization Chart　3-7

Adding Subordinates To the Work Group

Having entered information about the manager, now you add the subordinates that report directly to him or her. Proceed as follows:

1. Press Cursor Down [↓] to move to the lower box, the subordinates' box.

2. Type the name of the first subordinate that you want to appear on the printed chart and press Enter [↵]. The subordinates' box expands to make room for a second subordinate.

3. Enter as many direct subordinates as the topmost manager has (up to 16). They will appear left-to-right on the printed chart as they appear top-to-bottom in the box on the screen.

Notice that Org automatically fills in the Chart Level as one more than the person's manager, in other words, the next lower level. If the person works at an even lower level, you can specify a larger number.

Org also provides for staff level employees. They are identified with an S in the Chart Level field. A staff level employee cannot have subordinates. Consequently, a staff level employee is displayed differently on the screen.

The Line Type specifies whether an individual is connected to their manager with a solid line (S), a dotted line (D), or no line at all (N). Org automatically assumes that you want a solid line; you only need to change it if that is not the case. Since the topmost manager has no one above him or her, he or she has no field for a line type.

Chances are some of the subordinates of the topmost manager also have people reporting to them. The next section explains how to add these people to the chart.

3-8  Building An Organization Chart

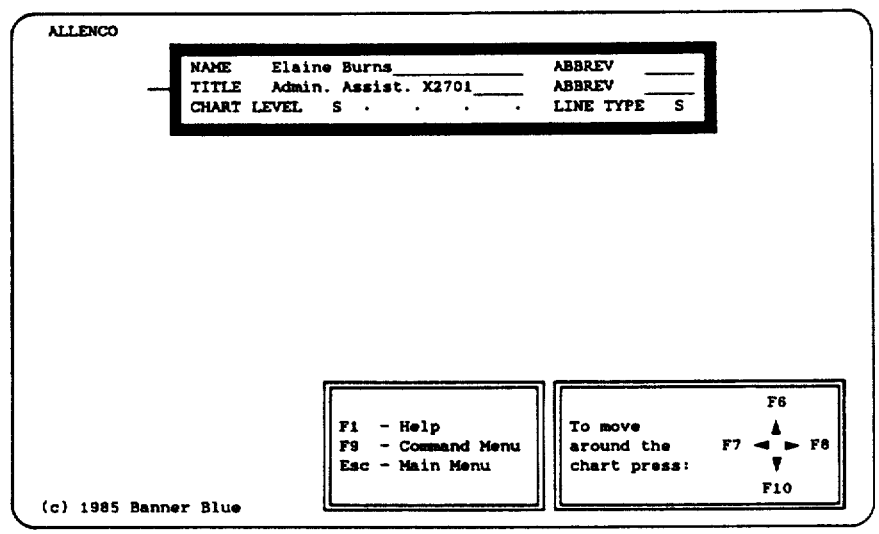

Work group of staff level employee

Additional Work Groups

The work group is Org's building block. A subordinate in one work group is automatically the manager of a work group at the next lower level. When you display an individual's own work group you can add information about that person, for example a title. You can also add subordinates.

Follow these steps:

1. Select a person to which you want to add information or subordinates.

2. Press Cursor Up [↑] or Cursor Down [↓] to move the cursor to that person's row in the subordinates' box.

3. Press [F10] to perform the command Show Lower Work Group.

Org displays a new work group with the individual you chose at the top. Notice that the level for subordinates in the subordinates' box is automatically set to 3, one level lower than the manager's level. Remember, you can change this as you add subordinates' names.

Building An Organization Chart  3-9

4. Add information about the manager then add his or her subordinates.

Note: As you add work groups to your chart, keep in mind that your printer can print only so many characters across one page. If you type long names, titles, and comments, then fewer individuals can fit across the page.

It is also important to keep in mind that Org makes every box at a given level the same size. Therefore, just one long name, title, or comment can force Org to allocate extra space for everyone at a level.

Full names will not fit across page with this printer and chart size.

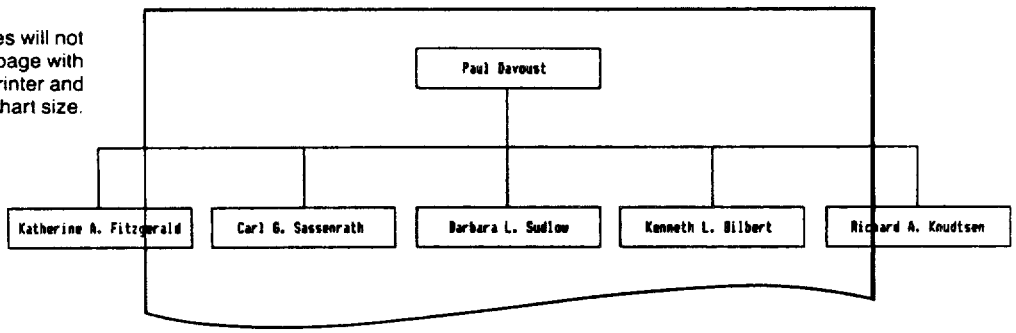

Using first initials, the chart will fit perfectly.

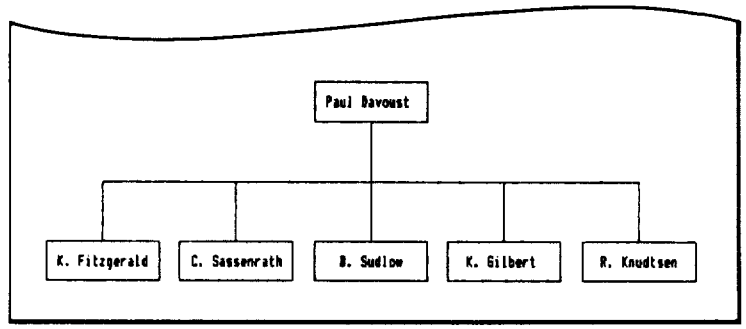

How you can help make the chart fit 3-10 Building An Organization Chart

It is a good idea to limit the length of names, titles, and comments at levels with lots of individuals and/or fill in the Abbrev fields. (We're not suggesting that you rename people! You can use initials rather than full names and so forth.) How much you limit the length depends on your printer and the complexity of your chart.

Moving Between Work Groups

This section describes how you can move around the chart in any direction.

1. Press [F6] (from anywhere in your current work group) to perform the command Show Higher Work Group. Org will display the topmost manager's work group.

2. Select another person to which you want to add information or subordinates by moving the cursor to their row and pressing [F10].

If you have gotten the idea that your whole organization chart is arranged in the memory of your computer, you're right! Each work group is like a window through which you see a piece of your organization. You can move that window anywhere. Org has four keys, analogous to the cursor keys in a spreadsheet or a word processor, that allow you to move in any direction in your organization chart. So far you have used only the up and down keys, [F6] and [F10]. Here is the whole set of keys for moving around the chart:

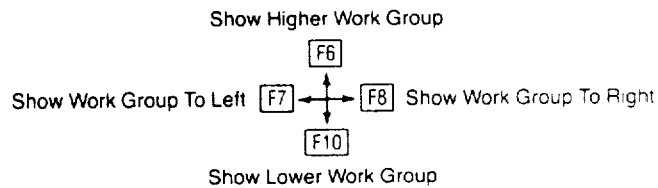

[F7] and [F8] allow you to move sideways within a level. Notice how these keys are laid out on the IBM PC keyboard, they have been chosen so that they are easy to remember.

Take some time to move around your chart as it now stands. Notice that when you each the extreme top, bottom, left, or right, the keys for moving around do nothing.

Some of the positions in your chart will have no subordinates. Org represents them as a work group, too. This makes it easy to add subordinates should you ever need to. A single blank row at the bottom of the subordinates' box or a subordinates' box that is entirely empty are ignored by Org when the chart is printed. (Note that blank rows elsewhere in the subordinates' box will print as empty boxes.)

For the purposes of moving around the chart, staff level employees are considered to be at the same level of the chart as normal subordinates.

You may have noticed that [F10], Show Lower Work Group, has some helpful characteristics. If your cursor is in a manager's box when you press [F10], the work group of his or her leftmost subordinate (at the highest level of subordinates) will be displayed. If the person identified in the manager's box has no subordinates, the leftmost work group of the next lower level will be displayed.

There is also a way to move from wherever you are to another work group in a single jump.

3-12  Building An Organization Chart

The Command Menu   The Command Menu provides another way to perform commands.

1. Press [F9] from anywhere in your chart. Immediately you will see the first page of the pop-up Command Menu. Selecting Modify or Print Chart will display the second page. You can return to the first page by pressing [Esc].

The first page of the Command Menu has all the commands for moving around and displaying the chart. The second page has the commands for modifying or printing the chart.

Every choice in the Command Menu can also be performed directly with the proper function key. In fact, you have already used four of the five "Show" commands that you see in the menu. You did this when you pressed [F6], [F7], [F8], and [F10] to move around the chart. When learning to use Org, it is a good idea to use the Command Menu for most of the other Org functions.

We said that we were going to learn how to make a single jump to any other work group in your chart, so let's do that.

2. Select Index by Name from the first page of the Command Menu. A list of names will appear, alphabetized by the first characters you typed into the Name fields.

3. Use the [↑] and [↓] and [PgUp] and [PgDn] keys to select the name of the person you want to display and press Enter [↵].

You will move directly to that person's work group.

Note: If you have not typed a name into one or more of your positions, those blank fields will appear at the top of the alphabetized list.

Building An Organization Chart    3-13

Finish adding any other employees to your chart and then you will learn how to print it out.

Note: It's a good idea to make your first chart small. Keep it to 10 or 12 individuals until you get the hang of things.

Printing a Chart  If you did not configure your system as described in Chapter 2, do so now before proceeding.

To print a chart make sure your printer is connected and online. If you have been using your printer with another software product, it is a good idea to reset the printer (turn it off, then back on). Then follow these steps:

1. Press [F9] to display the Command Menu. Select Modify or Print Chart. This will display the second page of the Command Menu.

2. Select Print Chart. Print Chart will print your entire chart regardless of your current location within it.

You will be asked a number of questions to make sure that the chart appears as you want it to appear:

1. Org asks you, Print to the printer or to a disk file?
   Select Printer.

2. Next, Org asks, What size chart do you want? You can select any size, regardless of the size of your paper. If you specify a chart size larger than the paper in your printer, Org will print the chart out on multiple pages. The text on the pages will overlap so that you can trim the edge of one and tape it to the other. (Later you will learn about the choice named Unlimited.)

If you have a large number of people in your chart or if you have a letter quality printer that prints only 10 or 12 characters per inch, you will probably want to select a size of 14 × 11 inches. Make your choice.

3-14 Building An Organization Chart

3. Finally, Org asks, Chart Format? Specify the printing of employee names, titles, comments, and boxes (around each employee) in whatever combination you want. A chart title, subtitle, or footnote is optional. Press Enter [↵] from the last selection or [Alt] - [F10] (signifying choices are complete) from anywhere in the form.

4. Org automatically formats your chart. If your unaltered chart is too large to fit on the page size you specified, Org asks if it should shrink your chart.

The objective of the shrinking process is to make your chart fit on the page while preserving as much information as possible. To shrink a chart, Org follows a process that can result in the use of abbreviations and printing some employees in a vertical list.

At the very lowest level of the chart, Org has the ability to present employees as a vertical list. Only the first line of text (name, title, or comment) will be printed. This vertical list takes up much less space than if each person had their own box.

When shrinking a chart, Org may also print the abbreviations you typed in the Abbrev fields of each work group. If you did not give an abbreviation, Org will generate one by taking the first five characters of the full name, title, or comment.

If Org asks whether to shrink your chart you can:

- Select Yes to proceed
   - Select No to exit printing
   - Press [Esc] to back up and make changes to your print request.

For your first chart select Yes and see what happens.

5. Sometimes a chart will not fit even after shrinking. In such cases Org asks your permission to trim the chart. To trim a chart, Org will print as many levels as possible and cut off the rest.

Keep in mind Org may trim a level because that level is too wide, not because the overall chart is too high. (These levels are not erased from memory. The only action Org takes is to suppress printing.) Some of the shrinking discussed above may also occur.

If Org asks whether to trim your chart you can select Yes, No, or press [Esc] as in the previous step.

Refer to Appendix B, Tips on Making a Large Chart, for ways to avoid both shrinking and trimming. Or, you can choose the Unlimited chart size described below.

If you choose Unlimited when Org asks, What size chart do you want?, your chart will be printed as wide as necessary (on additional pages, without shrinking) and as tall as the paper in your printer.

Choosing Unlimited also gives you access to Advanced Format choices. This form allows you to manually control the use of vertical lists, the size of type used by your printer, and other items. It also asks you whether to overlap the printing of pages. Generally, you should overlap the pages if you will be taping them together. It will make them easier to assemble.

Note: Do you have some unexpected empty boxes or positions in your chart? That means you accidentally created some blank fields in one of the subordinates' boxes. Except for the bottom field, blank fields print out as blank boxes (you may want to do that on purpose). You can remove those empty positions using Delete Position, described in Chapter 4.

Saving a Chart

One of the advantages of Org over other methods of making an organization chart is the ease of modifying it when your organization changes. For this it is necessary to save the chart.

1. From your current location in the chart, press [Esc]. Org will return you to the Main Menu.

2. Select Save Chart from the Main Menu. Org will display the Save Chart window.

3. The Drive (or path) field should display the drive (or path) for saving charts that you specified in the section "Configuring Your System." If that drive is a diskette drive, make sure it contains a formatted diskette.

If you want the chart saved to a different drive (or path), press Tab [→I] to move to the Drive (or path) field. Type in the correct drive (or path). Press Enter [↵].

If the Drive (or path) field is empty, the chart will be stored on your default drive.

Note: Path is an advanced DOS command. Its use is optional and most people can ignore it.

4. Type the name you want into the Filename field (in DOS format) and press Enter [↵]. Org will confirm that your chart has been saved.

If you have previously saved the same chart on the diskette or fixed disk, its name will automatically appear in the Filename field. To replace the chart on the disk with your current one, press Enter [↵]. Org will ask you to confirm your action when you try to replace another chart on the disk.

Erasing a Chart     You may want to start a new chart after working on another.

1. If the Main Menu is already displayed proceed to step 2. Otherwise, press [Esc] to return to the Main Menu.

2. Select Erase Chart from the Main Menu.

3. Org will check to make sure that you have saved any chart that you may have modified. If you have not saved your chart, Org will warn you that the chart will be erased.

Select Yes to erase the chart and return to the Main Menu. Org will confirm that it has erased the chart.

Select No to return to the Main Menu for another chance to save your chart.

Note: Erase Chart only clears the work area. It does not erase a chart from your disk or diskette.

Retrieving a Chart     To retrieve a chart from a diskette or fixed disk:

1. If the Main Menu is already displayed proceed to step 2. Otherwise, press [Esc] to return to the Main Menu.

2. Select Retrieve Chart from the Main Menu.

3. Org will check to make sure that you have saved any chart you may currently be working on. If you have not saved your chart, Org will warn you that the chart will be erased. Select Yes to erase the chart and display the Retrieve Chart window. Select No to return to the Main Menu for another chance to save your chart.

4. If you want the chart retrieved from a different drive (or path) than displayed in the Drive (or path) field, press Tab [→|] to move to the Drive (or path) field. Type in the correct drive (or path). Press Enter [↵].

If the Drive (or path) field is empty, the chart will be retrieved from your default drive.

5. You can select the name of the chart to retrieve in either of two ways.

- You can highlight the name using the Cursor keys [↑] [↓] [→] [←]. When you have highlighted the name of the chart you want to retrieve, press Enter [↵].

- Or, you can type the name of your chart into the Filename field and press Enter [↵]. Once you start to type a filename, you cannot use the Cursor keys to highlight a name listed below the Filename field.

Org will retrieve your chart and display the topmost person.

4 Other Functions

This chapter describes additional functions which will allow you to maximize the value of Org.

All commands or functions may be invoked directly with the appropriate function key or by selecting them from the Command Menu (obtained by pressing [F9]).

Append Chart [Alt] - [F9]: Org lets you attach a chart from your disk to the chart you are currently working on. This is called appending a chart.

To append another chart stored on your disk proceed as follows:

1. Place the cursor where you want the topmost manager of the chart you are appending to appear as a subordinate.

2. Select Append Chart. Org will bring up a window which asks you to identify the name of the chart you want to append.

3. Select a chart (as described in the section "Retrieving a Chart") and Org will append it.

Delete Position [F4]   Delete Position is used to delete a single position or an entire branch of a chart.

When a position is deleted, the box entirely disappears from the printed organization chart. If one employee has simply been replaced by a new one, you should type over the former employee's name. There is no need to delete the position.

To eliminate a single position, follow these steps:

1. Place the cursor on the position to be eliminated.

2. Select Delete Position. Org will ask you to confirm that you want to delete the position. Select Yes if that is still your intention.

3. If the position being deleted has subordinates reporting to it, Org asks if you want to delete just the individual's position or the group. Select Individual. All the subordinates will then be made to report to the next higher manager. (If this would give the next higher manager more than the maximum allowable 16 subordinates, Org will disallow the operation.)

To eliminate a branch of the chart (a position's immediate work group and all of the lower work groups reporting through the position), follow these steps:

1. Place the cursor on the topmost position to be eliminated.

2. Select Delete Position. Org will ask you to confirm that you want to delete the position. Select Yes if that is still your intention.

3. When Org asks whether you want to delete an individual or a group, select Group. (Org asks this question only if the position has subordinates.)

4-2 Other Functions

Note: There must be one and only one topmost position in each chart. For that reason the topmost position can be deleted only if it has exactly one subordinate reporting directly. If a topmost position having several subordinates were deleted as an individual, that would result in those subordinates being the heads of several unconnected work groups. Org is not designed to handle that.

If you want to delete the entire chart, select Erase Chart from the Main Menu.

Insert Position [F3]   Insert Position allows you to insert a new level into the chart or insert a new subordinate position anywhere in the subordinates' box. The action depends on where you are when you select Insert Position.

To insert a new level of management into the chart:

1. Place the cursor anywhere in the manager's box of the individual that reports to the new position.

2. Select Insert Position. An empty manager's box will be displayed. Everyone reporting through the new manager will be moved down in the chart one level.

You can also insert a new position in the subordinates' box:

1. Place the cursor anywhere in the row in which you want the new subordinate.

2. Select Insert Position. The position containing the cursor and all those below it will move down so that you can type in the new subordinate.

Move Position [Alt] - [F3]   Move Position allows you to "pick-up" a position or an entire branch of the chart and move it somewhere else.

The simplest type of move involves rearranging the individuals in the subordinates' box under a single manager. Follow these steps:

1. Place the cursor on the position you want to move.

2. Select Move Position. Org displays an asterisk by the name of the person to be moved.

3. Now, move the cursor to the row in which you want the position placed.

4. Select Move Position once more.

Org will confirm that you indeed want to move the person selected earlier. Assuming you have not changed your mind, select Yes. The previous occupant of that row and the individuals below will be moved down, and the person you identified earlier will be moved in. If any of the individuals being shuffled have subordinates, they will be moved right along with their manager.

If you select No or press [Esc], Org will cancel your request to move the position.

You can also move a position so that it reports to another manager.

1. Place the cursor on the position you want to move.

2. Select Move Position. Org displays an asterisk by the name of the person to be moved.

4-4 Other Functions

Print Part [Alt] - [F2]   Printing part of a chart is the same as printing the whole chart except that you specify the area of the chart to be printed.

1. Place the cursor on the position you want to be at the top of the printed chart.

2. Select Print Part. Org will confirm the name of the person to be at the top of the chart and ask you how many levels you want to print. If you want to print all the way to the bottom of the chart, select All levels.

From this point on, printing part of a chart is the same as printing all of the chart (see Chapter 3).

Print to Disk   You can print an entire chart [F2] or just part of a chart [Alt] - [F2] to a disk file.

When either of the two print commands asks: Print to the printer or to a disk file? You should select File.

The file will be written in a format compatible with the printer you specified when you configured the system. This file cannot be loaded back into Org.

To print the disk file using DOS, use the DOS COPY command (some graphics characters being sent to your printer might cause the DOS PRINT command to behave incorrectly):

copy/b *file-specification device-name*

If you want to write an ASCII file to disk, re-configure your system as described in Chapter 2 selecting one of the printers named Other.

3. Display the location in the chart where the position should now appear. (You can do other things along the way; Org will remember the position you want to move.) If you want to insert the position as a new level in the chart, place the cursor in the manager's box of the work group that should report to the person being moved. Otherwise, place the cursor at the appropriate place in the subordinates' box under a work group's manager.

4. Select Move Position once again. Org will confirm that you want to move the position you selected. Assuming you have not changed your mind, select Yes.

Depending on a number of conditions, Org may need to ask more questions.

If the position being moved has subordinates, and you have placed the cursor in the subordinate area of another work group, Org will ask if you want to move just the individual or the group. Select Group if you want the position's immediate work group and all lower work groups reporting through the position to be moved. This action picks up a branch of the chart and attaches it at the desired location. Select Individual if you want the subordinates left behind. Org will name the manager of the work group left behind "Open."

If the position being moved has subordinates, and you want to insert it as a new level elsewhere in the chart, Org will inform you that the subordinates must be left behind. A work group can be attached to another position, but it cannot be inserted. Org will create a new position for the individual being moved and name the one left behind "Open." If you want to move the subordinates as well, additional steps are required. First, move the management position as described, then move the Open position so that it reports to the first person moved. Finally, delete the Open position.

Other Functions 4-5

Save Part [Alt] - [F8]   Save Part will save to a disk file any part of the organization chart you are currently working on. The piece that is saved can be worked on as a chart in its own right or it can be appended to another chart.

To save part of a chart:

1. Place the cursor on the position you want at the top of your saved chart. Every work group below and reporting through this position will be saved.

2. Select Save Part. Org will display a window in which you must choose a name for your chart then press Enter [←].

3. Org will save the part of your chart you specified.

Note: If you Save Part from the position of the topmost manager, it is equivalent to selecting Save Chart from the Main Menu.

Show Entire Chart [F5]   Show Entire Chart lets you see a map of your chart. It is very useful for seeing where your current work group is with regard to the rest of the organization.

Each regular position will appear as a small square. Each staff position will appear as a dash. The current position will blink on and off. If you have a very large chart, some of the individual positions may overlap.

You can leave the map by pressing any key.

Show Top Work Group [Alt] - [F6]   Show Top Work Group displays the work group of the topmost manager directly from your location anywhere in the organization chart.

If you are already at the top level of the chart, nothing will happen when you try to Show Top Work Group.

Options [Alt] - [F7]   Options highlight a position with unique treatment such as a special box type.

To set options:

1. Place the cursor on the position you want to set options for.

2. Select Options. Org will identify the options available.

3. Make your choices then Press Enter [↵] from the last selection or [Alt] - [F10] from anywhere in the form.

Appendix A  Key Assignments

Editing Text in a Field
- Cursor Left [←] and Cursor Right [→] to move character-by-character without erasing.
- [Ctrl]-Cursor Left [←] and [Ctrl]-Cursor Right [→] to move word-by-word without erasing.
- Backspace [⬅] to back up and erase the previous character.
- [Home] and [End] to move to the beginning or the end of the field.
- [Ins] to enter insert mode for squeezing characters between those already there. (Your cursor changes to a small block to let you know that you are in insert mode.) Press [Ins] again to turn insert mode off.
- [Del] to delete characters to the right, one-by-one.
- [Caps Lock] and [Num Lock] work in the normal fashion.

Selecting Menu Items
- Spacebar moves one position.
- Cursor keys [↑] [↓] [←] [→] move one position.
- [Home] and [End] move to the first or last selection that you can currently see on the screen.
- If the selections overflow the window (this can happen in Saving and Retrieving charts or when using the Index by Name), [Ctrl] - [Home] and [Ctrl] - [End] move to the first or last selection in the list.
- [PgUp] and [PgDn] move one page at a time in the Index by Name.

Moving Between Fields   For moving between fields in a work group or a form (such as the Chart Format when printing or Configuration — Page 2):

- Tab [→|] moves one field to the right until at the rightmost field, then it moves down and to the leftmost field.
- Reverse Tab [|←] moves one field to the left until at the leftmost field, then it moves up and to the rightmost field.
- Cursor Up [↑] and Cursor Down [↓] move to the field immediately above or below the current field.
- [Ctrl] - Cursor Up [↑] and [Ctrl] - Cursor Down [↓] move to the upper left or lower left field.
- Enter [↵] moves down and to the left. Exceptions: Enter [↵] adds additional fields when at the bottom row of a work group and when pressed while in the bottom row of a form it signifies that you have completed work on the form.

Note: All of the keys for moving among data entry fields, except Enter [↵] , wrap from the top to the bottom of the screen and vice versa.

Selecting Commands
```
F1  - Help
F2  - Print Chart
F3  - Insert Position
F4  - Delete Position
F5  - Show Entire Chart
F6  - Show Higher Work Group
F7  - Show Work Group To Left
F8  - Show Work Group To Right
F9  - Command Menu
F10 - Show Lower Work Group Alt-F2  - Print Part
Alt-F3  - Move Position
Alt-F5  - Index by Name
Alt-F6  - Show Top Work Group
Alt-F7  - Options
Alt-F8  - Save Part
Alt-F9  - Append Chart
Alt-F10 - Choices Complete
```

A-2   Key Assignments

Appendix B

Tips on Making A Large Chart

The best way to make a large chart is to use the Unlimited chart size when you print. Unlimited charts may be as wide as necessary and as tall as the paper in your printer. However, it is not always possible to choose the Unlimited chart size. Sometimes the chart must fit on a single page in your printer. This appendix describes Org's automatic shrinking process which comes into operation if you do not choose the Unlimited chart size. It also gives tips on how to take advantage of that process.

The number of characters that can be printed across a page is determined by your printer. This means only a given number of employees can fit across the page.

For example, let's assume your printer allows a maximum of 80 characters in a line across the page. Let's also assume that at the widest part of your chart there are 5 employees across. If we divide 5 into 80 we find that each employee can be no wider than 16 characters across (that includes room for the box and space between the boxes). Since Org uses up 6 characters for the box and spaces between them, the names, titles, and comments can be 10 characters long at most. If the names were 11 characters long, 5 employees would no longer fit across the page.

Org allocates space for each employee at a given level based on the longest name, title, or comment at that level. One extremely long name or title can force Org to allocate extra space for everyone at that level and in the levels above. Org does this so that at each level every employee can have a box of the same size. A position also has a box at least as large as those in the level below. It's protocol!

If Org finds that the employees will not fit across the page you have specified, it is forced to shrink the chart or abandon printing. Org will first try to make the chart narrower by placing individuals at the lowest level of the chart in a vertical list. If that is unsuccessful, it will try abbreviating names, titles, and comments level-by-level.

To control the amount of shrinking that occurs, you must make sure that you have not made the names, titles, and comments too long. The table, "Guidelines on Text Length," gives you a starting point to judge how long each name can be given your printer and the number of employees in a level. However, it is only an estimate. It holds only if the employees are contiguous. If a manager at the next higher level has no subordinates, he or she will cause gaps to occur between subordinates below. The names, titles, and comments would have to be even shorter in that case.

There are four dots at the bottom of each manager's box to help judge text length. They line up with the 10th, 15th, 20th, and 25th characters of the name, title, and comment fields.

At the top levels of your chart, where there are fewer positions across, you can generally have longer names, titles, and comments.

Name Length  If you are preparing a large chart, type in just the names of the various employees, keeping in mind the guidelines for text length. Print out the chart and see how it looks. If it looks good, go back and enter the rest of the text making sure that you keep it shorter than the longest name at each level.

On the other hand, if there has been undesirable shrinking, find the employee with the longest name at the level that seems to be causing the problem. As a test, type into the Comment field of that employee a shorter version of his or her name (for example, use a first initial rather than the full first name).

B-2  Tips On Making a Large Chart

To avoid shrinking, follow these guidelines for the maximum allowable length of a name, title, or comment at a given level of your chart. Guidelines assume that you are printing boxes around each position (text can be two characters longer if you are not printing boxes).

For Printers With 10 Characters Per Inch

| Chart Width | 8.5" | 11" | 14" |
|---|---|---|---|
| # of Employees Across Level | Max Length of Name, Title, or Comment | | |
| 2 | 25 | 25 | 25 |
| 3 | 20 | 25 | 25 |
| 4 | 14 | 20 | 25 |
| 5 | 10 | 15 | 21 |
| 6 | 7 | 11 | 16 |
| 7 | 5 | 9 | 13 |
| 8 | 4 | 7 | 10 |
| 9 | 2 | 5 | 9 |
| 10 | 2 | 4 | 7 |
| 11 | 1 | 3 | 6 |
| 12 | | 2 | 5 |
| 13 | | 2 | 4 |
| 14 | | 1 | 3 |
| 15 | | 1 | 3 |
| 16 | | | 2 |
| 17 | | | 1 |
| 18 | | | 1 |
| 19 | | | 1 |

For Printers With 16-18 Characters Per Inch

| Chart Width | 8.5" | 11" | 14" |
|---|---|---|---|
| # of Employees Across Level | Max Length of Name, Title, or Comment | | |
| 2 | 25 | 25 | 25 |
| 3 | 25 | 25 | 25 |
| 4 | 25 | 25 | 25 |
| 5 | 19 | 25 | 25 |
| 6 | 15 | 22 | 25 |
| 7 | 12 | 18 | 25 |
| 8 | 10 | 15 | 21 |
| 9 | 8 | 12 | 18 |
| 10 | 6 | 10 | 15 |
| 11 | 5 | 9 | 13 |
| 12 | 4 | 8 | 12 |
| 13 | 3 | 6 | 10 |
| 14 | 3 | 6 | 9 |
| 15 | 2 | 5 | 8 |
| 16 | 2 | 4 | 7 |
| 17 | 1 | 3 | 6 |
| 18 | 1 | 3 | 6 |
| 19 | | 2 | 5 |
| 20 | | 2 | 4 |
| 21 | | 2 | 4 |
| 22 | | 1 | 3 |
| 23 | | 1 | 3 |
| 24 | | | 3 |
| 25 | | | 2 |
| 26 | | | 2 |
| 27 | | | 2 |
| 28 | | | 1 |
| 29 | | | 1 |

Note: There will be variations among printers. Use these estimates as a starting point.

Guidelines on Text Length

Now print the chart again, but ask to print Comment fields only. Answer No to Names and Titles. The printed boxes will be empty except for the ones with "test" names. If the name is not abbreviated by Org, you know that by keeping all text to the length of your test name (for that level and below) you will have the chart you want. Enter the balance of your information and print normally. If the name is still being abbreviated, try again with an even shorter test name.

The beauty of Org is that you can do a test like this in matter of minutes because Org is doing all the work, not you!

Of course, most charts that Org shrinks look just fine. They can look even better if you plan ahead.

Vertical Lists   Many people prefer a chart that has employees at the lowest level listed vertically instead of in boxes. This is also one of Org's most effective ways of shrinking a chart; however, you must be careful not to eliminate this tool from Org's bag of tricks.

If you can avoid it, don't put just one or two people at the lowest level of a large chart.

Org can only generate vertical lists of people who are at the lowest level. For the vertical list to effectively shrink a chart, the lowest level should have the largest number of individuals. Fortunately, most organizations are structured that way.

Abbreviations   Make good use of abbreviations. Org will generate them for you by taking the first five characters, but that is not the most attractive solution. Supply your own at levels of the chart where they are needed.

One trick is to place the most important information in the Abbrev fields, rather than short versions of what is in the full length fields. For example, if the name is the most important information to appear on your chart, you might want to put the first name in the top Abbrev field and the last name in the second and/or third Abbrev fields.

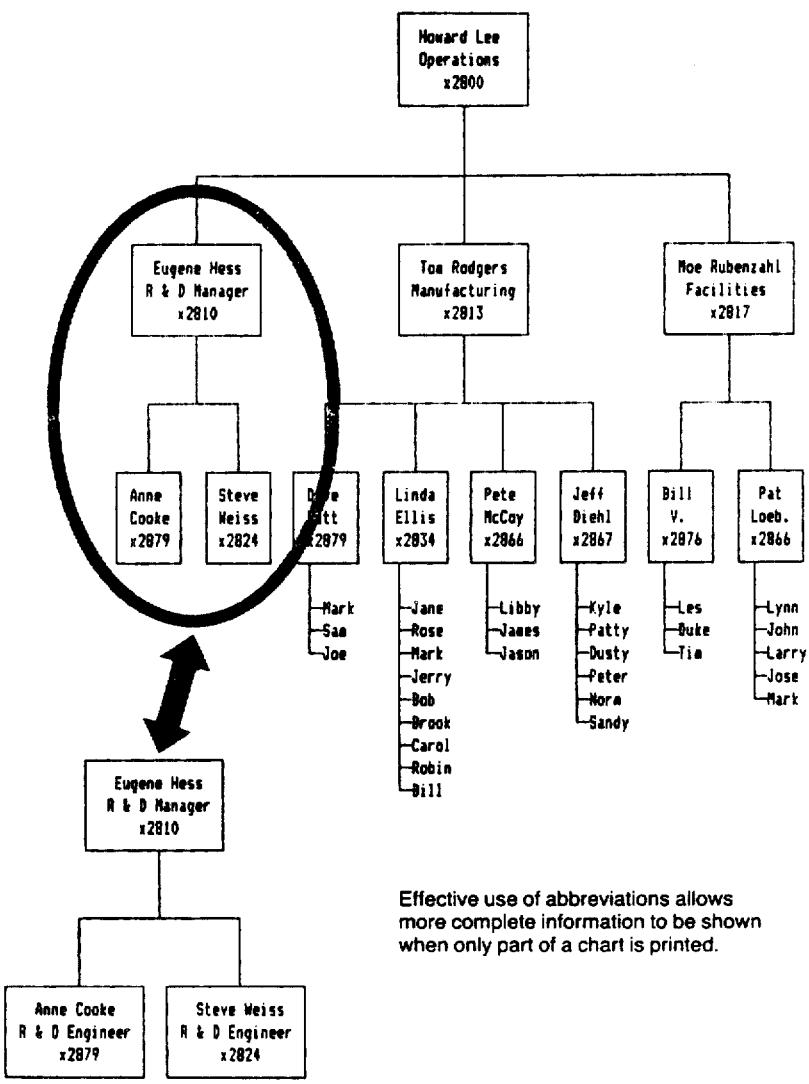
Effective use of abbreviations
Tips On Making a Large Chart   B-5

Sometimes it is possible to set up Org so that carefully selected abbreviations are printed when the entire chart is printed, but the whole name, title, or comment is printed when only a part of the chart (such as a department) is printed.

Other Tips
- Try selecting a larger size for your chart.
- Charts printed without boxes take up less space than ones that have them. If you are currently asking for boxes, you can specify a chart without them.
- If a chart is too high (top to bottom), you can reduce the number of lines of text. For example, print names and titles instead of names, titles, and comments.
- Space is reserved on the page for the chart title and subtitle only if you have them. Thus, a chart without a title can be slightly higher than one with a title.

When It's Too Big
Some charts are just too big to print out all at once. Print out the chart in smaller pieces such as departments or branches. Org may not need to shrink any of the pieces.

With Org you can try several different presentations in a matter of minutes and select the one you prefer.

Appendix C  Memory Utilization And Other Org Limits

- There is an upper limit of approximately 250 positions in the chart. A removed report, a position that is more than a single level down from its manager, uses the equivalent of one position for every intervening level. (If your system has only 128KB of memory, there is an upper limit of approximately 50 positions.)
- There is a maximum of 16 subordinates per manager.
- A chart can have only one position at the topmost level.
- A chart can have a maximum of 99 levels.

Index

A
ABBREV field, 3-7
abbreviations
    entering, 3-7
    tips on using, B-4
    use by Org, 3-15
adding subordinates to the work group, 3-8
additional work groups, 3-9
add position to a chart,
    see Insert Position
    see also adding subordinates
administrative assistants,
    see staff level employees
Append Chart (Alt-F9), 4-1
ASCII file, 4-6
asynchronous communications adapter,
    see printers
attach chart, see Append Chart

B
backing out, 3-2
blank boxes, 3-12, 3-16
boss, see topmost manager
boxes, in printed chart, 3-15, B-3
box, manager's, 3-3
box, subordinates', 3-3
building an organization chart, 3-1

C
capacity, see limits
characters per inch, 2-5
chart
    footnote, 3-15
    format, specifying, 3-15
    subtitle, 3-15, B-6
    title, 3-15, B-6
CHART LEVEL field, 3-7, 3-8
charts
    adding subordinates, 3-8
    building, 3-1
    example, 1-2
    height, B-6
    introduction, 1-1
    levels, 1-2, 3-7, 3-8
    moving around, 3-4
    shrinking, 3-15
    size, 3-14
    starting, 3-6
    terms, 3-2
    tips for large charts, B-1
    trimming, 3-15
    work group, 3-2
Choices Complete (Alt-F10), 3-15
choices, making, 3-1
clear, see Erase Chart
clearing a chart
    see erasing a chart
Command Menu (F9), 3-13
commands, 3-1
    Append Chart (Alt-F9), 4-1
    Choices Complete (Alt-F10), 3-15
    Command Menu (F9), 3-13
    Delete Position (F4), 4-2
    Help (F1), 3-2
    Index by Name (Alt-F5), 3-13
    Insert Position (F3), 4-3
    keys to select, A-2
    Move Position, (Alt-F3), 4-4
    Options (Alt-F7), 4-8
    Print Chart (F2), 3-14
    Print Part (Alt-F2), 4-6
    Save Part (Alt-F8), 4-7
    Show Entire Chart (F5), 4-7
    Show Higher Work Group (F6), 3-11
    Show Lower Work Group (F10), 3-9
    Show Top Work Group (Alt-F6), 4-7
    Show Work Group to Left (F7), 3-11
    Show Work Group to Right (F8), 3-11
COMMENT field, 3-6
comment length, 3-10, B-1, B-3
Configure System menu item, 2-5
configuring your system, 2-5
continuous forms, using, 2-7
copying the Org diskette, 2-1
cpi, 2-5
cursor keys, A-1
    using to make choices, 3-1

D

Delete Position (F4), 3-16, 4-2
demote employee
    see Move Position
department
    see starting a chart
DISKCOPY command, 2-2
diskette, copying Org, 2-1
diskette drive, 1-3
Disk Operating System (DOS), 1-3
display, 1-3
division, see starting a chart
dotted line report, see LINE TYPE
drive (or path), 2-8, 3-17, 3-19

E editing fields, 3-7
    keys, A-1
empty boxes, 3-12, 3-16
equipment, 1-3
Erase Chart menu item, 3-18, 4-3
erasing a chart, 3-18
Escape, see backing out
essential terms, 3-2
example
    organization chart, 1-2
exiting Org, 2-8

F fields, 3-6
    ABBREV, 3-7
    CHART LEVEL, 3-7, 3-8
    COMMENT, 3-6
    editing, 3-7, A-1
    Filename, 3-17, 3-19
    LINE TYPE, 3-7
    moving between, 3-7, A-2
    NAME, 3-6
    TITLE, 3-6
Filename field, 3-17, 3-19
fire employee, see Delete Position
fixed-disk system, 2-3
footnote, chart, 3-15
format, specifying chart, 3-15 function keys
    F1 (Getting Help), 3-2
    F2 (Print Chart), 3-14
    F3 (Insert Position), 4-3
    F4 (Delete Position), 4-2
    F5 (Show Entire Chart), 4-7
    F6 (Show Higher Work Group), 3-11
    F7 (Show Work Group to Left), 3-11
    F8 (Show Work Group to Right), 3-11
    F9 (Command Menu), 3-13
    F10 (Show Lower Work Group), 3-9
    Alt-F2 (Print Part), 4-6
    Alt-F3 (Move Position), 4-4
    Alt-F5 (Index by Name), 3-13
    Alt-F6 (Show Top Work Group), 4-7
    Alt-F7 (Options), 4-8
    Alt-F8 (Save Part), 4-7
    Alt-F9 (Append Chart), 4-1
    Alt-F10 (Choices Complete), 3-15

G getting a chart
    see retrieving a chart
getting help, 3-2
getting started, 2-1
group, 4-2, 4-5
guidelines on text length, B-3

H height of chart, B-6
Help (F1), 3-2
hiring employees, see Insert Position
    see also adding subordinates

I

IBM PC, 1-3
IBM PCjr, 1-3
Index by Name (Alt-F5), 3-13
insert characters, see editing fields
Insert Position (F3), 4-3
installing Org on a fixed disk, 2-3
introduction to Org, 1-1

L large charts
    tips on making, B-1
lay-off employee, see Delete Position
length of name, title, comment, 3-10, B-1, B-3
length of paper setting, 2-7
letter quality printer, see printers
levels
    chart, 1-2, 3-7
    limits, C-1
    staff, 3-5, 3-8, 3-12
    see also additional work groups
limits, C-1
LINE TYPE field, 3-8

M

Main Menu, 2-5
    see also, menu items
making choices, 3-1
manager
    see topmost manager
Manager's box
    definition, 3-3
map of chart
    see Show Entire Chart
memory
    requirements, 1-3
    utilization, C-1
menu items
    Configure System, 2-5
    Erase Chart, 3-18
    Modify or Print Chart, 3-13, 3-14
    Quit, 2-8
    Retrieve Chart, 3-18
    Save Chart, 3-17
    Work on Chart, 3-6
Modify or Print Chart menu item, 3-13, 3-14
Move Position (Alt-F3), 4-4
moving
    around chart, 3-4
    between fields, 3-7, A-2
    between work groups, 3-11
multiple managers, see topmost manager

N

NAME field, 3-6
name length, 3-10, B-1, B-2, B-3
new hires
    see Insert Position
    see also adding subordinates

O one-diskette drive system
    starting, 2-3
open position, 4-5
operating system
    see Disk Operating System
Options (Alt-F7), 4-8
Org
    building charts, 3-1
    introduction, 1-1
    starting, 2-1
organization chart
    example, 1-2

P paper width, length
    selecting chart size, 3-14
    setting, 2-7
parallel printer port, 1-3
path, 2-8, 3-17, 3-19
PC-XT
    installing Org, 2-3
position
    open, 4-5
    see also starting a chart
preview chart
    see Show Entire Chart
Print Chart (F2), 3-14
printer adapter, 1-3
printers, 1-3
    configuring system, 2-5
    resetting, 3-14
printing charts, 3-10, 3-14
    tips for large charts, B-6
Print Part (Alt-F2), 4-6
Print to Disk, 4-6
promote employee, see Move Position

Q quitting Org, 2-8

R range commands
    see Print Part
    see also Save Part
README, 1-3
reduce work force
    see Delete Position
remove employee
    see Delete Position
reorganize chart
    see Move Position
replace employee, 4-2
requirements
    equipment, 1-3
Retrieve Chart menu item, 3-18
retrieving a chart, 3-18

S

Save Chart menu item, 3-17
Save Part (Alt-F8), 4-7
saving charts, 3-17
    see also configuring your system
secretaries
    see staff level employees
selecting commands
    keys, A-2
selecting menu items
    keys, A-1
    see also making choices
serial port, see printers
shrinking charts, 3-15
Show Entire Chart (F5), 4-7
Show Higher Work Group (F6), 3-11
Show Lower Work Group (F10), 3-9
Show Top Work Group (Alt-F6), 4-7
Show Work Group to Left (F7), 3-11
Show Work Group to Right (F8), 3-11
Sideways™ printing
    see README
size
    chart, 3-14, B-6
    paper, 2-7, 3-14
    see also limits
some essential terms, 3-2
span of control, see limits
specifications, C-1
staff level employees, 3-5, 3-8, 3-12
starting a chart, 3-6

4 starting a fixed-disk system, 2-4
starting a one- or two-diskette drive system, 2-3
subordinates
    adding to work groups, 3-8
    maximum number, C-1
    titles and comments, 3-9
    vertical listing, 3-5
subordinates' box
    definition, 3-3
subtitle, chart, 3-15, B-6

T terms, 3-2
text length
    guidelines, B-3
tips on making a large chart, B-1
title, chart, 3-15, B-6
TITLE field, 3-6
title length, 3-10, B-1, B-3
topmost manager, 3-6, 4-3, 4-7
    limits, C-1
transfer employee, see Move Position
trimming charts, 3-16
two-diskette drive system
    starting, 2-3

U unfilled position, see empty boxes
unlimited chart size, 3-16, B-1

V vertical listing of subordinates, 3-5, 3-15, B-4

W what can Org do, 1-1
what equipment and software are needed, 1-3
width of paper
    setting, 2-7
work group
    adding subordinates to, 3-8
    adding to chart, 3-9
    definition, 3-2
    moving to or between, 3-11, 3-13
    see Show Top Work Group
    see also starting a chart
working copy of Org, 2-1
Work On Chart menu item, 3-6

I claim:

1. In a user-controlled interactive computer display system for constructing a hierarchy which has a single topmost node and a number of subordinate nodes such that each node has information in an associated data entry field stored about it, and each subordinate node has only one superior node, an improved method of assembling the nodes in the hierarchy comprising the steps performed in selected sequence of:
   determining if a topmost node exists;
   creating a topmost node if the topmost node is determined not to exist;
   displaying in one selected location on said user-controlled interactive computer display system a selected portion of the information stored about one node to identify such node to the user as a current superior node;
   displaying in another selected location a list of the subordinate nodes to said current superior node comprising a selected portion of the information stored about each subordinate node and at least one data entry field not associated with a node;
   selectively changing said information stored about the nodes;
   creating a new subordinate node to said current superior node in response to the user entering information in said one data entry field; and
   selecting for display another node as said current superior node.

2. The method according to claim 1 wherein said step of selecting optionally displays a node that is superior to said current superior node, subordinate to said current superior node, a left sibling of said current superior node, or a right sibling of said current superior node.

3. The method according to claim 1 wherein said one selected location and said another selected location are demarcated.

4. The method according to claim 1 wherein said one selected location and said another selected location are demarcated and adjacent.

5. In a computer display system for viewing, modifying, or constructing any kind of hierarchy, an improved method of displaying information stored about said hierarchy comprising the steps of:
   displaying in one selected location on said computer display system a selected portion of the information stored about a superior node to identify said superior node; displaying in another selected location a list of subordinate nodes to said superior node comprising a selected portion of the information stored about each subordinate node; and
   selecting for display another node as a new superior node.

6. The method according to claim 5 wherein said step of selecting optionally displays a node that is superior to said superior node, subordinate to said superior node, a left sibling of said superior node, or a right sibling of said superior node.

7. In a user-controlled interactive computer display system for constructing a hierarchy of multiple levels which has a single topmost node and a number of subordinate nodes such that each node has descriptive information in an associated data entry field stored about it, and each subordinate node has only one superior node, an improved method of assembling the nodes in the hierarchy comprising the steps performed in selected sequence of:
   determining if a topmost node exists;
   creating a topmost node if the topmost node is determined not to exist;
   displaying in one demarcated location on said user-controlled interactive computer display system a selected portion of the descriptive information stored about one node to identify the node to the user as a current superior node, and displaying in such one location positional information about said current superior node including a number identifying a level in the hierarchy;
   displaying in another demarcated location adjacent to said one demarcated location, a list of the subordinate nodes to said current superior node comprising a selected portion of the descriptive information about each of the subordinate nodes, and displaying in such adjacent location a number identifying a level in the hierarchy for each subordinate node, and displaying in such adjacent location at least one data entry field not assigned to one of the subordinate nodes;
   selectively changing said information stored about the nodes;
   creating or destroying intervening nodes between one subordinate node and its superior node that is more than one level lower in the hierarchy as the user changes the level of the one subordinate node;
   creating a new subordinate node to said current superior node in response to the user entering information in said one data entry field;
   selecting for display another node as a new current superior node;
   moving a number of nodes from one location in the hierarchy to another;
   inserting a new node at a selected location in the hierarcy;
   deleting a number of nodes; and
   processing the information stored about the nodes to produce an output indication of the hierarchy.

8. The method according to claim 7 comprising the additional step, performed prior to said processing step, of:
   assigning a value to a node that determines subsequent processing of the hierarchy.

9. The method according to claim 7 wherein said step of selecting optionally displays a node that is superior to said current superior node, subordinate to said current superior node, a left sibling of said current superior node, or a right sibling of said current superior node.

10. An interactive computer-controlled system for assembling a hierarchy which has a single topmost node and a number of subordinate nodes where each subordinate node has only one superior node, the system comprising:
    display means for displaying the nodes of the hierarchy;
    storage means for storing and retrieving information about each node;
    processor means coupled to the display means and to the storage means for accessing and processing the information stored in the storage means to provide a display of a selected number of nodes and the information about each;

said processor means identifying for display in one selected location a selected portion of the information stored about one node to identify such node as a current superior node, and identifying for display in another selected location a list of subordinate nodes to said current superior node comprising a selected portion of the stored information about each subordinate node; and input means coupled to said processor means for entering information about nodes into the storage means in response to operation of the input means, said input means supplying information in the data field for storage in the storage means and for processing by the processor means to identify for display by the display means a hierarchy including information stored about said current superior node and the selected number of subordinate nodes including a new subordinate node, said input means also for selecting for display another node as a new current superior node.

11. In a user-controlled interactive computer display system for constructing a hierarchy which has a single topmost node and a number of subordinate nodes such that each node has information in an associated data entry field stored about it, and each subordinate node has only one superior node, an improved method of assembling the nodes in the hierarchy comprising the steps performed in selected sequence of:

determining if a topmost node exists;

creating a topmost node if the topmost node is determined not to exist;

displaying in one selected location on said usercontrolled interactive computer display system a selected portion of the information stored about one node to identify such node to the user as current superior node;

displaying in another selected location a list of the subordinate nodes to said current superior node comprising a selected portion of the information stored about each subordinate node;

selectively changing said information stored about the nodes;

creating a new subordinate node to said current superior node; and selecting for display another node as a new current superior node.

12. The method according to claim 11 wherein said step of selecting optionally displays a node that is superior to said current superior node, subordinate to said current superior node, a left sibling of said current superior node, or a right sibling of said current superior node.

13. The method according to claim 11 wherein said one selected location and said another selected location are demarcated.

14. The method according to claim 11 wherein said one selected location and said another selected location are demarcated and adjacent.

15. In a user-controlled interactive computer display system for constructing a hierarchy of multiple levels which has a single topmost node and a number of subordinate nodes such that each node has descriptive information in an associated data entry field stored about it, and each subordinate node has only one superior node, an improved method of assembling the nodes in the hierarchy comprising the steps performed in selected sequence of:

determining if a topmost node exists;

creating a topmost node if the topmost node is determined not to exist;

displaying in one demarcated location on said user-controlled interactive computer display system a selected portion of the descriptive information stored about one node to identify the node to the user as a current superior node, and displaying in such one location positional information about said current superior node including a number identifying a level in the hierarchy;

displaying in another demarcated location adjacent to said one location a list of the subordinate nodes to said current superior node comprising a selected portion of the descriptive information about each of the subordinate nodes and displaying in such adjacent location a number identifying a level in the hierarchy for each subordinate node, and displaying in such adjacent location at least one data entry field not assigned to one of the subordinate nodes;

selectively changing said information stored about the nodes;

creating or destroying intervening nodes between one subordinate node and its superior node that is more than one level lower in the hierarchy as the user changes the level of the one subordinate node;

creating a new subordinate node to said current superior node in response to the user entering information in said one data entry field; and selecting for display another node as a new current superior node.

16. The method according to claim 15 comprising the additional step of moving a number of nodes from one location in the hierarchy to another.

17. The method according to claim 15 comprising the additional step of inserting a new node at a selected location in the hierarchy.

18. The method according to claim 15 comprising the additional step of deleting a number of nodes.

19. The method according to claim 15 comprising the additional steps of processing the information stored about the nodes to produce an output indication of the hierarchy.

20. The method according to claim 15 wherein said step of selecting optionally displays a node that is superior to said current superior node, subordinate to said current superior node, a left sibling of said current superior node, or a right sibling of said current superior node.

21. The method according to claim 15 wherein said step of selecting optionally displays the node chosen from a list of all nodes in the hierarchy.

* * * * *